US008248641B2

(12) United States Patent
Kazume et al.

(10) Patent No.: US 8,248,641 B2
(45) Date of Patent: Aug. 21, 2012

(54) NETWORK PRINTERS HAVING DISTRIBUTED PRINT JOBS FUNCTION AND UTILIZING WITHHOLD PRINTING COMMANDS

(75) Inventors: Minako Kazume, Kanagawa (JP); Hozumi Yonezawa, Tokyo (JP); Noboru Tamura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 843 days.

(21) Appl. No.: 12/207,650

(22) Filed: Sep. 10, 2008

(65) Prior Publication Data

US 2009/0091783 A1 Apr. 9, 2009

(30) Foreign Application Priority Data

| Oct. 3, 2007 | (JP) | 2007-260305 |
| Oct. 3, 2007 | (JP) | 2007-260306 |
| Oct. 3, 2007 | (JP) | 2007-260307 |
| Oct. 3, 2007 | (JP) | 2007-260308 |
| Jul. 22, 2008 | (JP) | 2008-188734 |
| Jul. 22, 2008 | (JP) | 2008-188735 |
| Jul. 22, 2008 | (JP) | 2008-188736 |
| Jul. 22, 2008 | (JP) | 2008-188737 |

(51) Int. Cl.
G06F 3/12 (2006.01)
G06K 15/00 (2006.01)
(52) U.S. Cl. ........................ 358/1.15; 358/1.13; 358/1.14
(58) Field of Classification Search .................. None
See application file for complete search history.

(56) References Cited

U.S. PATENT DOCUMENTS

| 5,812,747 A * | 9/1998 | Kayano et al. | 358/1.15 |
| 2004/0061909 A1 * | 4/2004 | Ferlitsch et al. | 358/474 |
| 2005/0068566 A1 * | 3/2005 | Nishiguchi | 358/1.15 |
| 2006/0221359 A1 * | 10/2006 | Mokuya | 358/1.1 |
| 2007/0182991 A1 * | 8/2007 | Matsuda | 358/1.15 |
| 2007/0206210 A1 * | 9/2007 | Miyazaki et al. | 358/1.14 |
| 2008/0123130 A1 * | 5/2008 | Matsumoto et al. | 358/1.15 |
| 2008/0140787 A1 * | 6/2008 | Shima | 709/206 |

FOREIGN PATENT DOCUMENTS

| JP | 2002-189581 | 7/2002 |
| JP | 2003-271347 | 9/2003 |
| JP | 3958016 | 5/2007 |

OTHER PUBLICATIONS

Fukazawa Nobuaki; "Information Processor . . . And Storage Medium"; JP Pub Date Jul. 2002; Machine Translation in English of JP Pub 2002189581.*

* cited by examiner

Primary Examiner — Benny Q Tieu
Assistant Examiner — Haris Sabah
(74) Attorney, Agent, or Firm — Oblon, Spivak, McClelland, Maier & Neustadt, L.L.P.

(57) ABSTRACT

A printing device is connected to a host apparatus and a lower level printing device. When the printing device receives printing target data from the host apparatus, it sends the same printing target data to the lower level printing device. A printing unit prints the printing target data on a recording medium on a page by page basis. A data-delete command issuing unit, for each printed page printed by the printing unit, issues a print data deleting command to the lower level printing device to instruct the lower level printing device to delete a portion of the printing target data corresponding to the printed page.

14 Claims, 18 Drawing Sheets

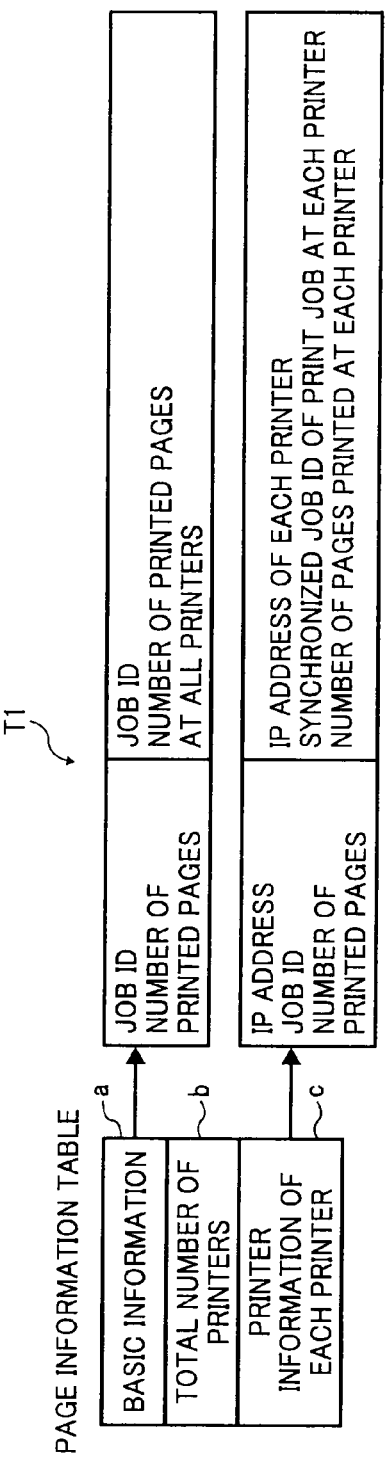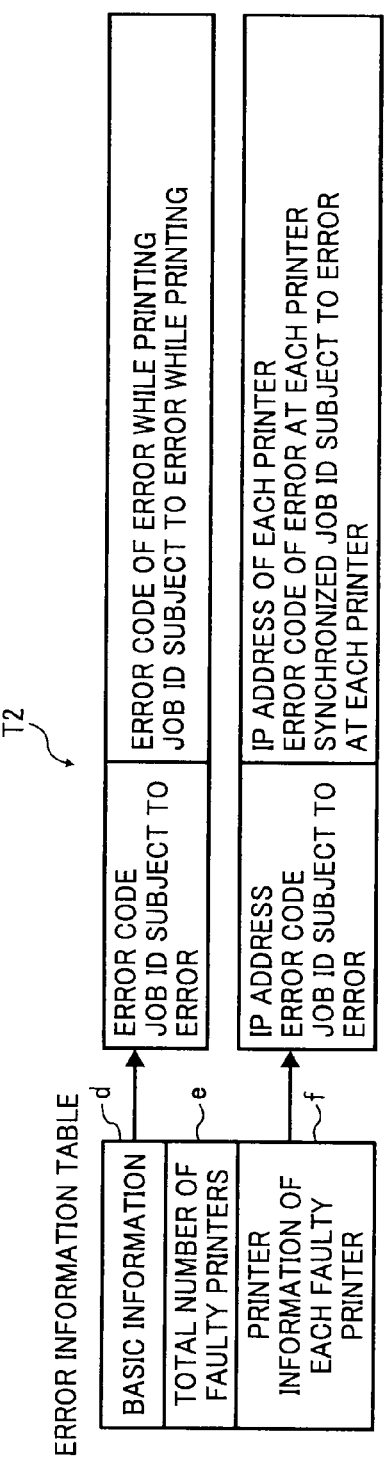

FIG. 18

- JOB ID: 0003
- DOCUMENT NAME: DOCUMENT 3
- TOTAL NUMBER OF PRINTED PAGES: 10

IP ADDRESS: 1.1.1.1
FIRST PRINTED PAGE: 00001
LAST PRINTED PAGE: 00005
NUMBER OF PRINTED PAGES: 00005
ERROR: PAPER-OUT CONDITION

IP ADDRESS: 1.1.1.2
FIRST PRINTED PAGE: 00006
LAST PRINTED PAGE: 00008
NUMBER OF PRINTED PAGES: 00003
ERROR: PAPER JAM CONDITION

IP ADDRESS: 1.1.1.3
FIRST PRINTED PAGE: 00009
LAST PRINTED PAGE: 00010
NUMBER OF PRINTED PAGES: 0002
ERROR:

NETWORK PRINTERS HAVING DISTRIBUTED PRINT JOBS FUNCTION AND UTILIZING WITHHOLD PRINTING COMMANDS

CROSS-REFERENCE TO RELATED APPLICATIONS

The present application claims priority to and incorporates by reference the entire contents of Japanese priority document 2007-260305 filed in Japan on Oct. 3, 2007, Japanese priority document 2007-260306 filed in Japan on Oct. 3, 2007, Japanese priority document 2007-260307 filed in Japan on Oct. 3, 2007, Japanese priority document 2007-260308 filed in Japan on Oct. 3, 2007, Japanese priority document 2008-188734 filed in Japan on Jul. 22, 2008, Japanese priority document 2008-188735 filed in Japan on Jul. 22, 2008, Japanese priority document 2008-188736 filed in Japan on Jul. 22, 2008 and Japanese priority document 2008-188737 filed in Japan on Jul. 22, 2008.

BACKGROUND OF THE INVENTION

1. Field of the Invention

The present invention relates to a network printing technology.

2. Description of the Related Art

In recent years, a network printing technology is being actively developed. For example, Japanese Patent Application Laid-open No. 2003-271347 discloses a network printing system in which printing is performed at a printer connected via a network such as Internet.

FIG. 19 is a schematic diagram for explaining a conventional network printing system. The network printing system in FIG. 19 is configured as an extranet environment in which an intranet environment 200 is connected to an intranet environment 300 via a network 400. In such a configuration, it is possible to carry out a print job at a printer arranged in the intranet environment 300 by giving a printing instruction from a host computer arranged in the intranet environment 200, and vice versa.

However, during a printing process, there is a possibility that an error such as a paper-out condition, a paper jam condition, or a toner empty condition occurs in the printer thereby causing interruption in the printing process. If the host computer is not notified about such an error, then there is a possibility that the problem is left unattended.

SUMMARY OF THE INVENTION

It is an object of the present invention to at least partially solve the problems in the conventional technology.

According to an aspect of the present invention, there is provided a printing device configured to print printing target data received from a host apparatus on a recording medium, the printing device connectable to a lower level printing device that is a different printing device arranged on a downstream side with respect to the host apparatus via a network. The printing device includes a withhold command issuing unit that issues a withhold command to the lower level printing device to instruct the lower level printing device to withhold printing a data sending unit that sends the printing target data to the lower level printing device; a printing unit that prints the printing target data on a recording medium on a page by page basis; and a data-delete command issuing unit that, for each printed page printed by the printing unit, issues a print data deleting command to the lower level printing device to instruct the lower level printing device to delete a portion of the printing target data corresponding to the printed page.

According to another aspect of the present invention, there is provided a printing device configured to print printing target data received from a host apparatus on a recording medium, the printing device connected to a higher level printing device that is a different printing device arranged on an upstream side with respect to the host apparatus via a network and the printing device is connectable to a lower level printing device that is a different printing device arranged on a downstream side with respect to the host apparatus via a network. The printing device includes a withhold command receiving unit that receives a withhold command from the higher level printing device, the withhold command instructing the printing device to withhold printing; a withhold command forwarding unit that forwards the withhold command to the lower level printing device, the withhold command instructing the lower level printing device to withhold printing; a data receiving unit that receives printing target data from the higher level printing device; a data sending unit that sends the printing target data to the lower level printing device; a printing unit that prints the printing target data on a recording medium on a page by page basis; a data-delete command receiving unit that receives a print data deleting command from the higher level printing device, the print data deleting command instructing the printing device to delete a portion of the printing target; a data deleting unit that deletes the portion of the printing target data specified in the print data deleting command; and a data-delete command forwarding unit that forwards the print data deleting command to the lower level printing device if installed, the printing target data deleting command instructing the lower level printing device to delete the portion of the printing target data specified in the print data deleting command.

According to still another aspect of the present invention, there is provided a printing system including two or more printing devices to perform printing of printing target data received from a host apparatus, the host apparatus being connected to the printing devices via a network. The printing system includes a monitoring request sending unit that sends a print status monitoring request generated by the host apparatus to a highest level printing device arranged on an upstream side of data communication; a monitoring request forwarding unit that sequentially forwards a print status monitoring request from the highest level printing device to a lowest level printing device arranged on a downstream side of data communication; an appending unit that appends response information generated in each of the printing devices corresponding to the print status monitoring request in a sequence from the lowest level printing device to the highest level printing device to obtain an appended response; an appended response sending unit that sends the appended response to the host apparatus; a print report generating unit that, based on the appended response, generates a print report regarding a print status of each of the printing devices; and a print report sending unit that sends the print report to a printing device from among the printing devices that performs printing at the last.

According to still another aspect of the present invention, there is provided a printing system including two or more printing devices to perform printing of printing target data received from a host apparatus, the host apparatus being connected to the printing devices via a network. The printing system includes a request sending unit that sends a request generated by the host apparatus to each of the printing devices in a sequence from a highest level printing device arranged on an upstream side of data communication to a lowest level printing device arranged on a downstream side of data communication; an appending unit that appends response information generated in each of the printing devices corresponding to the print status monitoring request in a sequence from the lowest level printing device to the highest level printing device to obtain an appended response; and an appended response sending unit that sends the appended response to the host apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a diagram for explaining an exemplary page information table maintained in the printer server;

FIG. 13 is a diagram for explaining an exemplary error information table maintained in the printer server;

FIG. 18 is a diagram of an exemplary print report generated during the print report generating process.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
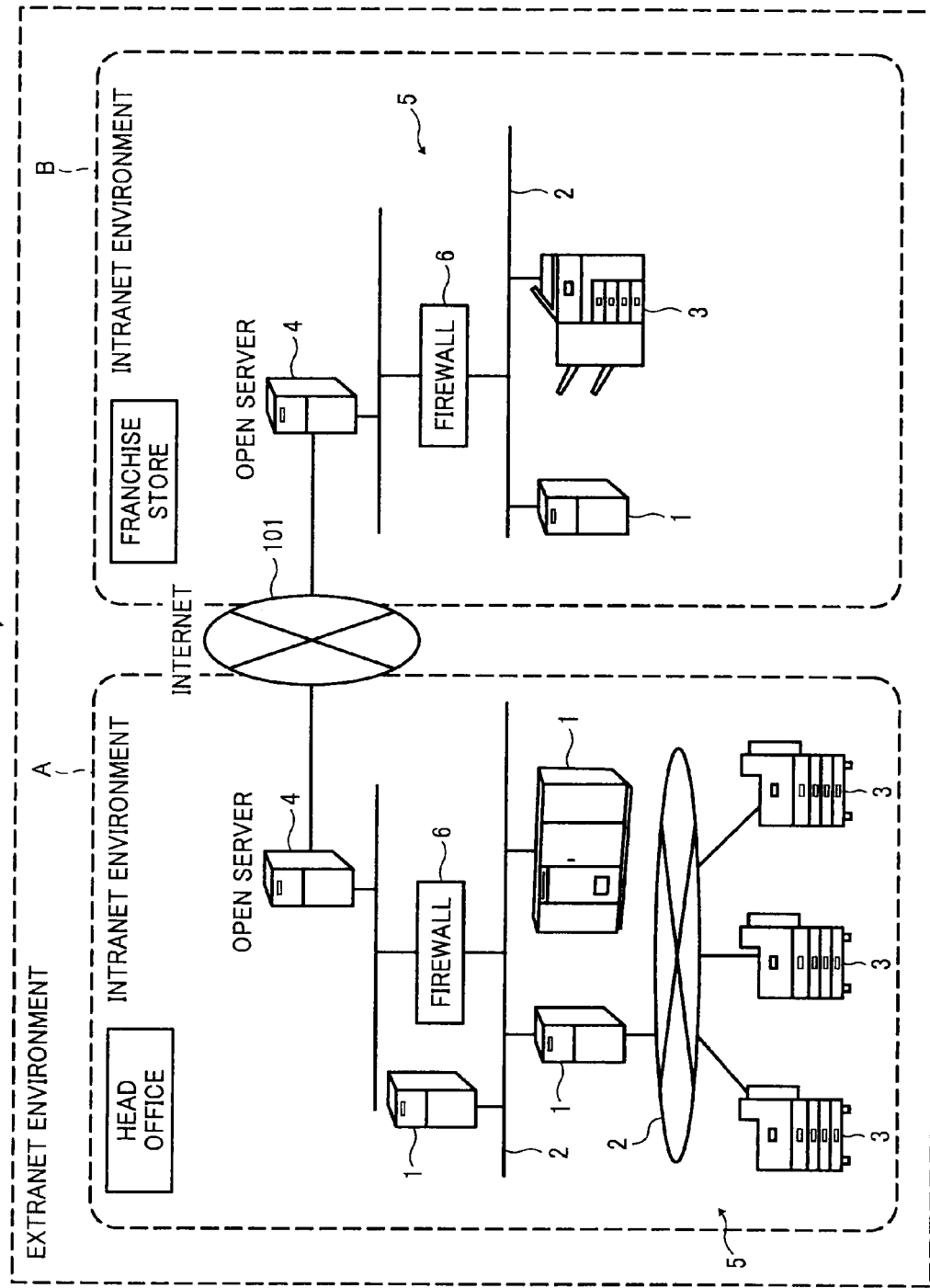
FIG. 1 is a schematic diagram of a network printing system according to an embodiment of the present invention.

FIG. 1 is a schematic diagram of a network printing system 100 according to an embodiment of the present invention. The network printing system 100 is configured as an extranet environment in which an intranet environment A is connected to an intranet environment B via an external network 101 such as Internet. Each of the intranet environments A and B is assumed to be, although not limited to, an in-house network environment of a business establishment configured based on Internet technology.

For example, the intranet environment A is assumed to be the in-house network environment of a head office of a convenience store chain, while the intranet environment B is assumed to be the in-house network environment of a franchise store of the convenience store chain. The intranet environment A includes an internal network system 5 that is connected to an open server 4 such as a World Wide Web (WWW) server via a firewall 6. The internal network system 5 is built on a client-server architecture in which a plurality of server computers 1 (hereinafter, "servers 1") and a plurality of client devices 3 are interconnected via a local network 2 such as a local area network (LAN). In the example shown in FIG. 1, the client devices 3 are assumed to be, although not limited to, printers. The firewall 6 is configured to monitor data packets that are communicated between the internal network system 5 and the external network 101 via the open server 4. From the security perspective of the internal network system 5, the firewall 6 determines whether to allow or to block the communication of each data packet based on predetermined conditions.

The intranet environment B has an identical configuration to the configuration of the intranet environment A, except that the number of servers 1 or the number of client devices 3 is not necessarily same.

Meanwhile, instead of using the external network 101, a dedicated communication line can be used to connect the intranet environment A to the intranet environment B. Similarly, instead of using the local network 2, dedicated communication lines can be used to connect the servers 1 to the corresponding client devices 3 in each of the intranet environments A and B.

Moreover, the local network 2 can be configured to be compatible to any one of wire communication, wireless infrared communication, wireless radio communication, optical fiber communication, and the like.

Figure 2:
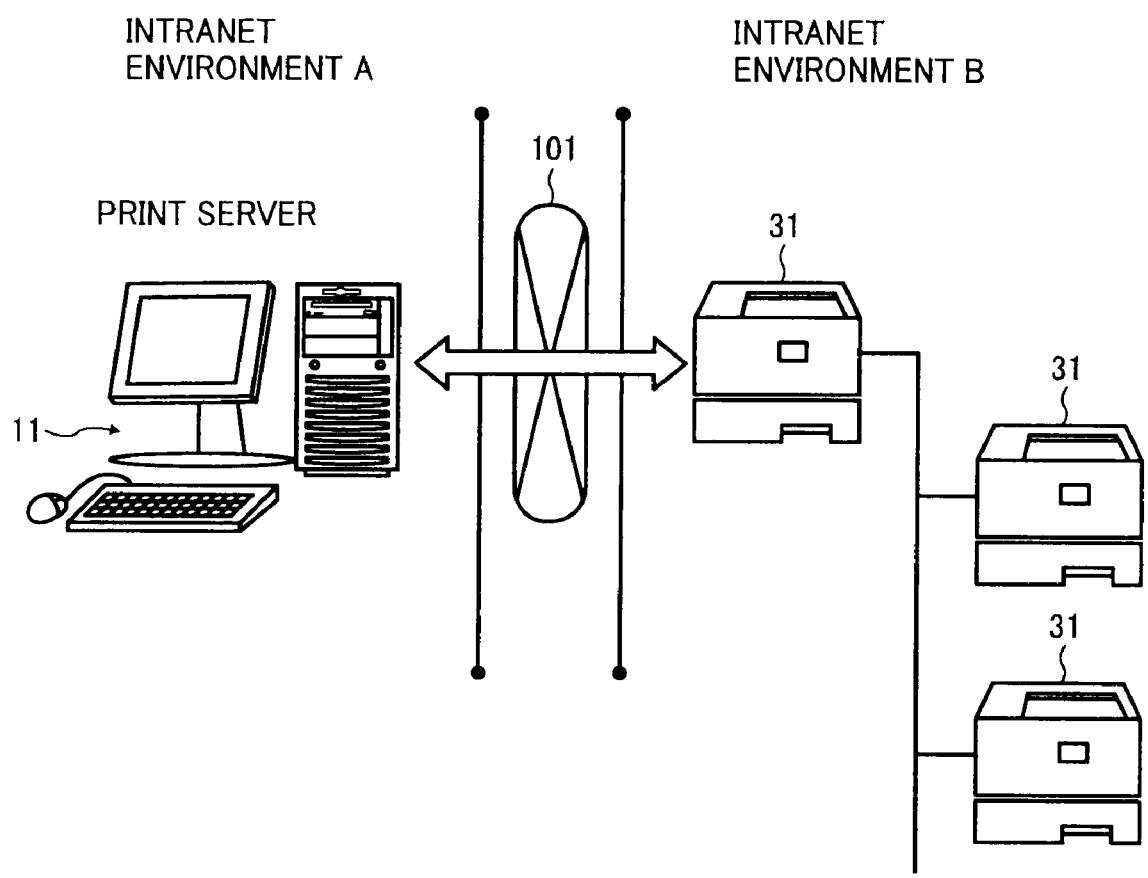
FIG. 2 is a schematic diagram for explaining an exemplary configuration of the network printing system.

In the network printing system 100, it is possible to carry out print jobs at a printer arranged in the intranet environment B by giving a printing instruction by using a server arranged in the intranet environment A, and vice versa. For example, as shown in FIG. 2, a printing instruction can be given to a uniquely-determined printer 31, which is one of a plurality of printers 31 arranged in the intranet environment B, by using a print server 11, which is one of the servers 1 arranged in the intranet environment A.

Figure 3:
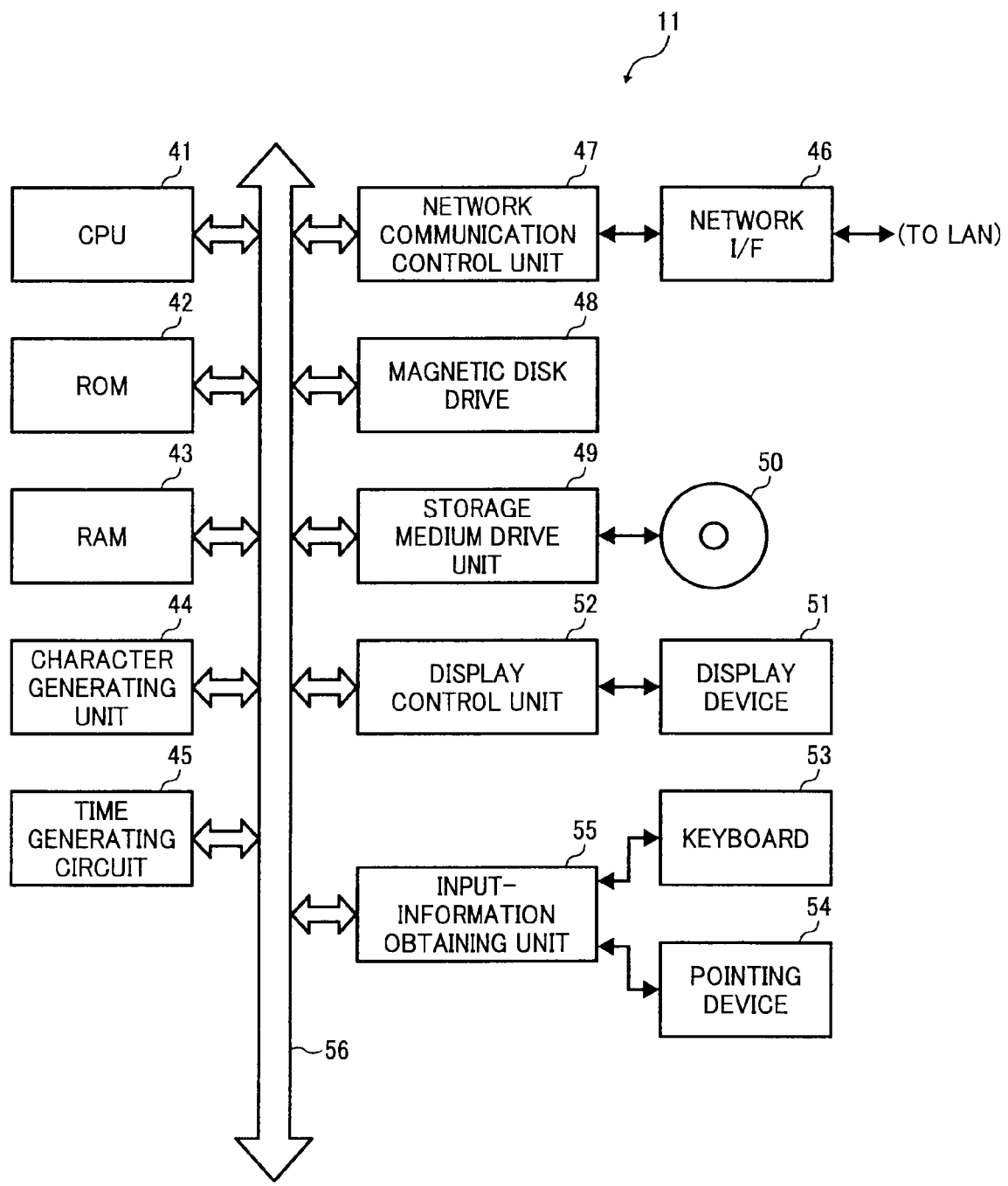
FIG. 3 is a block diagram for explaining an exemplary hardware configuration of a print server in the network printing system.

FIG. 3 is a block diagram for explaining an exemplary hardware configuration of the print server 11. The print server 11 includes a central processing unit (CPU) 41, a read only memory (ROM) 42, a random access memory (RAM) 43, a character generating unit 44, a time generating circuit 45, a network communication control unit 47, a magnetic disk drive 48, a storage medium drive unit 49, a display control unit 52, and an input-information obtaining unit 55. An internal bus 56 is used to interconnect the abovementioned hardware components. Moreover, a network interface (I/F) 46 is arranged to interface the print server 11 to the local network 2.

The CPU 41 controls the operations of the print server 11. The ROM 42 is used to store application programs and data necessary for booting the print server 11. The RAM 43 functions as a work area for the CPU 41. The character generating unit 44 generates graphic characters or display data. The time generating circuit 45 generates current time and date.

The network communication control unit 47 performs communication control processing of predetermined protocol suites. As a result, a variety of data can be communicated between the print server 11 and the servers 1 or the client devices 3 in any one of the intranet environments A and B. For example, the print server 11 can send print data to the uniquely-determined printer 31 or receive the status of ongoing print jobs from the uniquely-determined printer 31.

The magnetic disk drive 48 is used to store a variety of application programs that run on an operating system (OS) of the print server 11 and a variety of data such as work data, file data, and image data. One of the application programs stored in the magnetic disk drive 48 is a print data transmission program that is executed to send print data to a printer. The storage medium drive unit 49 reads a compatible removable storage medium 50 and obtains a variety of application programs or data stored therein.

When the print server 11 is turned ON, the CPU 41 executes a loader routine stored in the ROM 42 and loads the OS from the magnetic disk drive 48 into the RAM 43. The OS manages the hardware components and the application programs in the print server 11. Subsequently, according to user instructions, various functions such as executing application programs, reading information, and storing information are performed. An application program can be a computer program that runs in the OS, or that performs partial execution of any of the processing functions described below, or that is included in a set of program files configuring an application software or the OS. Meanwhile, the removable storage medium 50 can be a compact disk read only memory (CD-ROM), a flexible disk (FD), a CD recordable (CD-R), a CD rewritable (CD-RW), a digital versatile disk (DVD), a semiconductor storage medium, and the like.

Generally, an application program is installed in the magnetic disk drive 48 from the removable storage medium 50. However, it is also possible to directly execute an application program from the removable storage medium 50. Moreover, it is also possible to download an application program via the network I/F 46 and install it in the magnetic disk drive 48.

The display control unit 52 controls the contents of an operation screen that is displayed on a display device 51 such as a cathode ray tube.

The input-information obtaining unit 55 obtains user instructions and information input from a keyboard 53 or a pointing device 54 such as a mouse.

In the print server 11, a specific application program is executed to generate printing document information. Meanwhile, the printing document information can also be obtained by using the removable storage medium 50 or obtained through the external network 101 in the form of an attachment to an electronic mail. The printing document information is stored in the magnetic disk drive 48.

Figure 4:
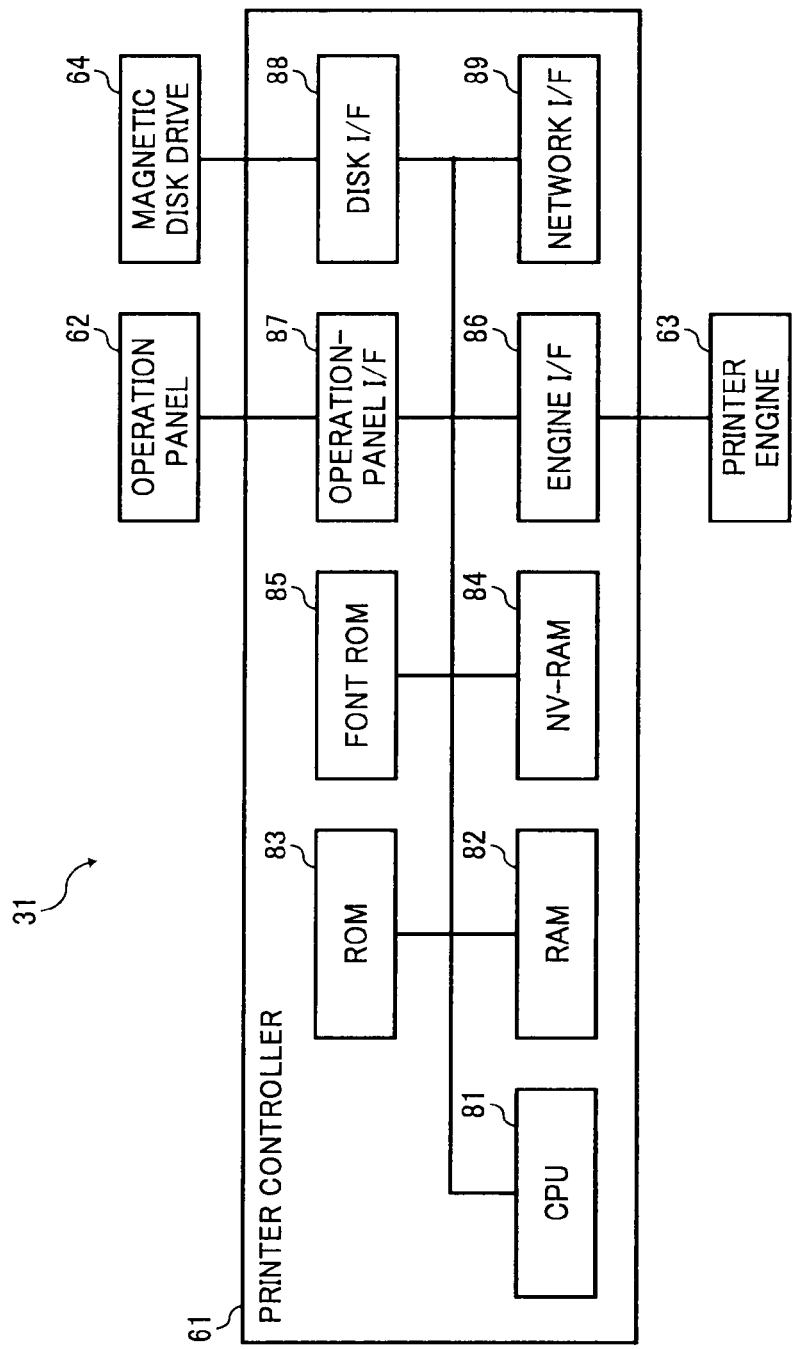
FIG. 4 is a block diagram for explaining an exemplary hardware configuration of a printer in the network printing system.

FIG. 4 is a block diagram for explaining an exemplary hardware configuration of each of the printers 31. Each of the printers 31 includes a printer controller 61, an operation panel 62, a printer engine 63, and a magnetic disk drive 64. The printer controller 61 functions as a motherboard for managing the hardware components and the printing operations of the corresponding printer 31.

More particularly, based on a current print mode and a printer control code, which is received from a print server (e.g., the print server 11), the printer controller 61 converts print data into image data and outputs the image data to the printer engine 63. The printer controller 61 has a modular configuration that includes a CPU 81, a RAM 82, a ROM 83, a non volatile RAM (NV-RAM) 84, a font ROM 85, an engine I/F 86, an operation-panel I/F 87, a disk I/F 88, and a network I/F 89. The CPU 81 controls the functioning of the corresponding printer 31. The ROM 83 is used to store printer-specific information. The NV-RAM 84 is used to store information that needs to be retained even when power is turned OFF. The font ROM 85 is used to store a plurality of printing fonts. The engine I/F 86 interfaces the printer controller 61 to the printer engine 63. The operation-panel I/F 87 interfaces the printer controller 61 to the operation panel 62. The disk I/F 88 interfaces the printer controller 61 to the magnetic disk drive 64.

The RAM 82 functions as a work area for the CPU 81, and is provided with a data buffer area for temporarily storing received data and with an image buffer area for temporarily storing images.

The printer controller 61 sends a print control signal to the printer engine 63 via the engine I/F 86 and receives a print status signal from the printer engine 63 via the engine I/F 86.

The network I/F 89 interfaces the corresponding printer 31 to the local network 2 such that the printer 31 can communicate print control signals, print status signals, print data, and the like with the servers 1 in the intranet environment A or the intranet environment B.

A user can use the operation panel 62 to set various print settings such as print status display setting, print mode setting, and printing condition setting.

The printer engine 63 forms an image by an electrophotographic process and prints the image on a recording medium such as a sheet of recording paper or an overhead projector (OHP) transparency. More particularly, based on image data and print control information from the printer controller 61, the printer engine 63 forms an image on a photosensitive member (not shown) in an electrostatic manner and transfers the image on the recording medium.

The magnetic disk drive 64 is used to store printing document information, various information files, the OS, and a plurality of application programs executed in the OS. One of the application programs stored in the magnetic disk drive 64 is a print job program that is executed to carry out a print job.

When a printer 31 is turned ON, the CPU 81 loads the OS from the magnetic disk drive 64 into the RAM 82. The OS manages the hardware components and the application programs in the printer 31. Subsequently, according to user instructions, various functions such as executing application programs, reading information, and storing information are performed. An application program can be a computer program that runs in the OS, or that performs partial execution of any of the print processing functions described below, or that is included in a set of program files configuring an application software or the OS.

Generally, an application program is installed in the magnetic disk drive 64 from a removable storage medium (not shown). However, an application program can be directly executed from the removable storage medium. Moreover, it is also possible to download an application program via the network I/F 89 and install it in the magnetic disk drive 64.

Meanwhile, instead of the magnetic disk drive 64, it is also possible to use a computer-readable storage medium such as a semiconductor memory for storing various application programs and the OS.

Given below is the description of a substitutive printing process in which one or more lower level printers are kept ready to substitutively perform printing of print data in case a problem occurs in a higher level printer while printing that print data.

In the example shown in FIG. 2, when the uniquely-determined printer 31 receives print data from the print server 11, the corresponding printer controller 61 converts the print data into image data based on the print control information and outputs the image data to the corresponding printer engine 63. A print command is issued to the printer engine 63 to start printing the image data. However, during the printing process, there is a possibility that an error such as a paper-out condition, a paper jam condition, or a toner empty condition occurs in the uniquely-determined printer 31 thereby causing interruption in the printing process. Usually, in such a case, the printing process resumes only when a user manually resolves the problem. However, in the network printing system 100, the printing process can be prevented from interruption by instructing one of the remaining printers 31 in the intranet environment B (hereinafter, "lower level printers 31") to continue printing of the print data in place of the uniquely-determined printer 31. In the example shown in FIG. 2, two lower level printers 31 are arranged with respect to the uniquely-determined printer 31. Meanwhile, the uniquely-determined printer 31 is hereinafter referred to as the main printer 31.

As described above, one of the application programs stored in the magnetic disk drive 48 is the print data transmission program. When the print data transmission program is executed in the OS of the print server 11, the CPU 41 accordingly transmits the print data to the main printer 31.

Similarly, one of the application programs stored in the magnetic disk drive 64 is the print job program. When the print job program is executed in the OS of the main printer 31, the CPU 81 controls the main printer 31 to print the print data transmitted by the print server 11.

Figure 5:
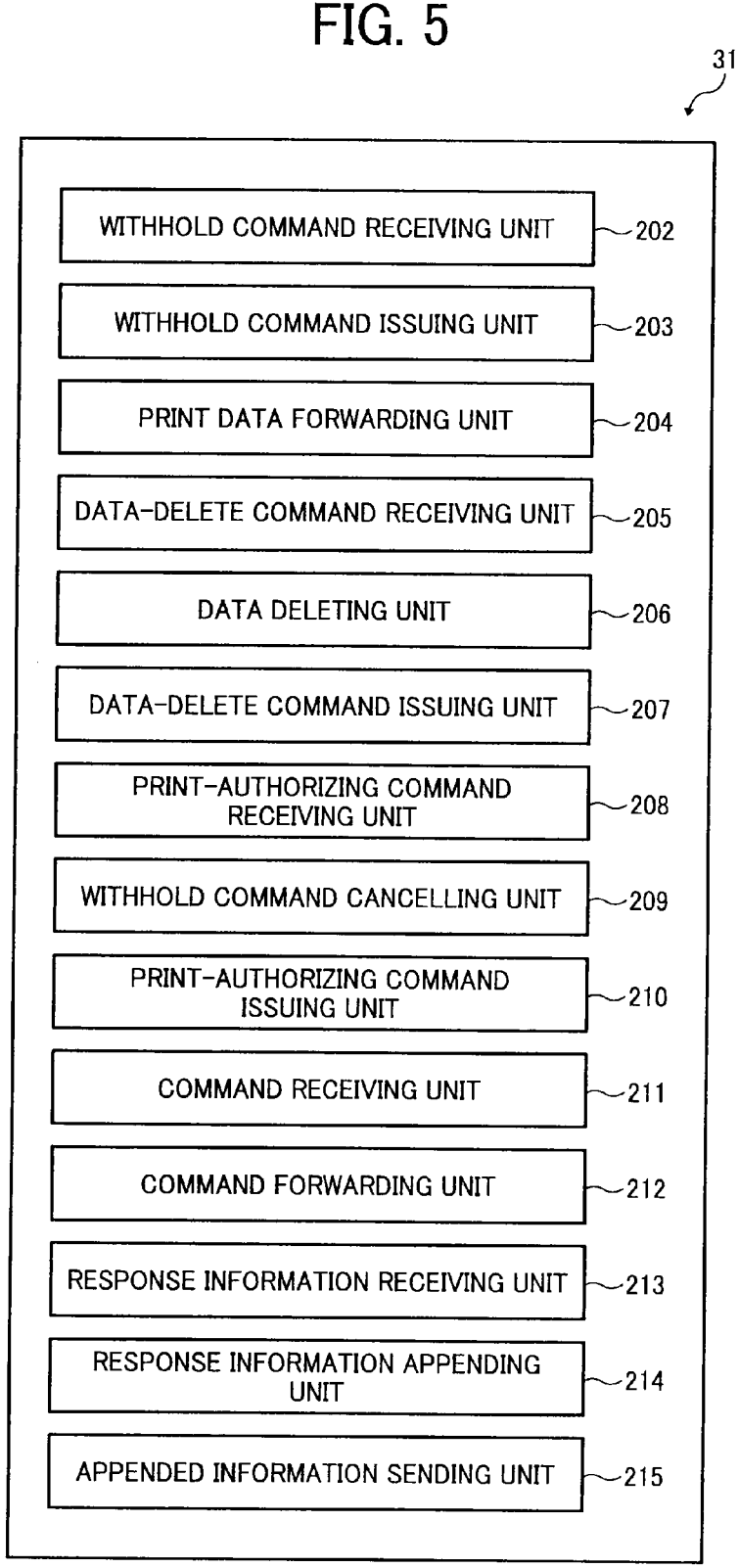
FIG. 5 is a block diagram for explaining a functional configuration of the printer implemented during a substitutive printing process.

FIG. 5 is a block diagram for explaining a functional configuration of each of the printers 31 implemented during the substitutive printing process. As shown in FIG. 5, each of the printers 31 includes a withhold command receiving unit 202, a withhold command issuing unit 203, a print data forwarding unit 204, a data-delete command receiving unit 205, a data deleting unit 206, a data-delete command issuing unit 207, a print-authorizing command receiving unit 208, a withhold command cancelling unit 209, a print-authorizing command issuing unit 210, a command receiving unit 211, a command forwarding unit 212, a response information receiving unit 213, a response information appending unit 214, and an appended information sending unit 215.

Figure 6:
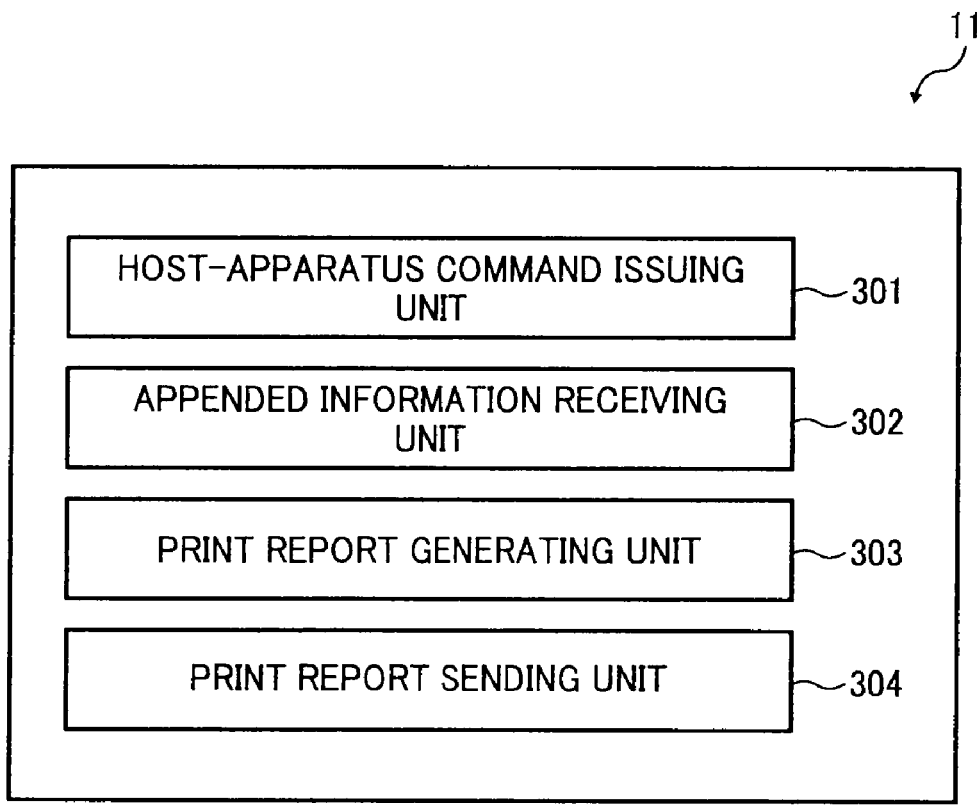
FIG. 6 is a block diagram for explaining a functional configuration of the print server implemented during the substitutive printing process.

FIG. 6 is a block diagram for explaining a functional configuration of the print server 11 for the substitutive printing process. As shown in FIG. 6, the print server 11 includes a host-apparatus command issuing unit 301, an appended information receiving unit 302, a print report generating unit 303, and a print report sending unit 304.

Figure 7:
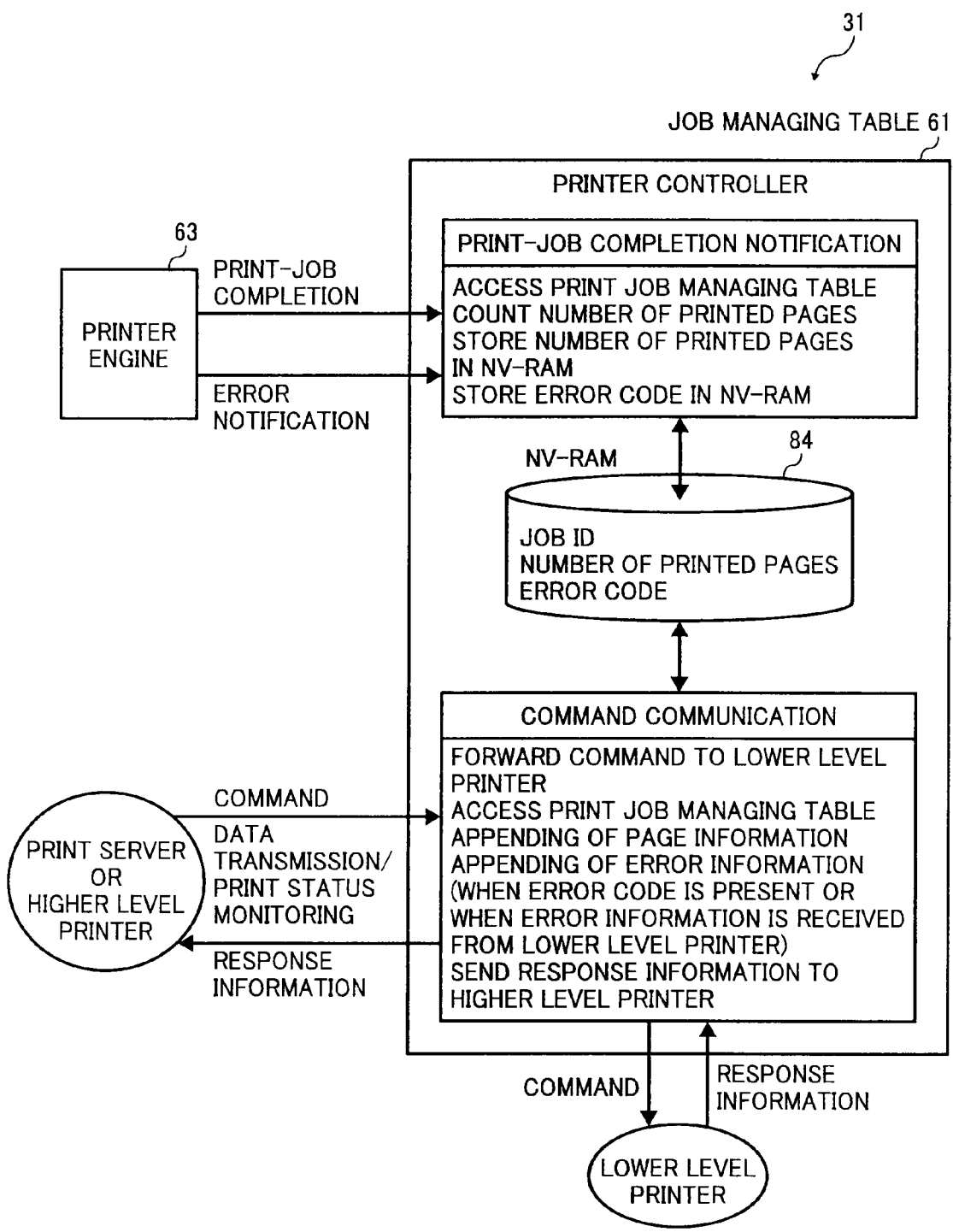
FIG. 7 is a diagram for explaining various functions performed by the printer during the substitutive printing process.

FIG. 7 is a diagram for explaining various functions performed by a printer 31 during the substitutive printing process.

In a printer 31, upon completion of each print job, the printer engine 63 sends a print-job completion notification to the printer controller 61. Subsequently, by using a unique job ID of the completed print job, the printer controller 61 stores the number of printed pages during the completed print job in a print job managing table, which is maintained in the NV-RAM 84. However, if the print job is interrupted due to an error, then the printer engine 63 sends a print-job failure notification to the printer controller 61. Subsequently, the printer controller 61 stores an error code for the interrupted print job in the print job managing table.

Meanwhile, in the intranet environment B, the main printer 31 receives various commands from the print server 11. A first level printer 31, which is arranged as an immediate lower level printer with respect to the main printer 31, receives the commands from the main printer 31. A second level printer 31, which is arranged as an immediate lower level printer with respect to the first level printer 31, receives the commands from the first level printer 31. For example, when the main printer 31 receives a data transmission command or a print status monitoring command from the print server 11, the corresponding printer controller 61 forwards that command to the first level printer 31. Similarly, when the first level printer 31 receives the data transmission command or the print status monitoring command from the main printer 31, the corresponding printer controller 61 forwards that command to the second level printer 31. On the other hand, when the first level printer 31 receives a response corresponding to the print status monitoring command (hereinafter, "print status monitoring response") from the second level printer 31, the corresponding printer controller 61 obtains page information (e.g., number of printed pages) and error information from the print status monitoring response, appends that information to page information and error information of its own, and updates the corresponding print job managing table with the appended information. Similarly, when the main printer 31 receives a print status monitoring response from the first level printer 31, the corresponding printer controller 61 obtains page information (including number of printed pages) and error information from the print status monitoring response, appends that information to page information and error information of its own, and updates the corresponding print job managing table with the appended information. Eventually, the main printer 31 sends the appended page information and error information to the print server 11.

Figure 8:
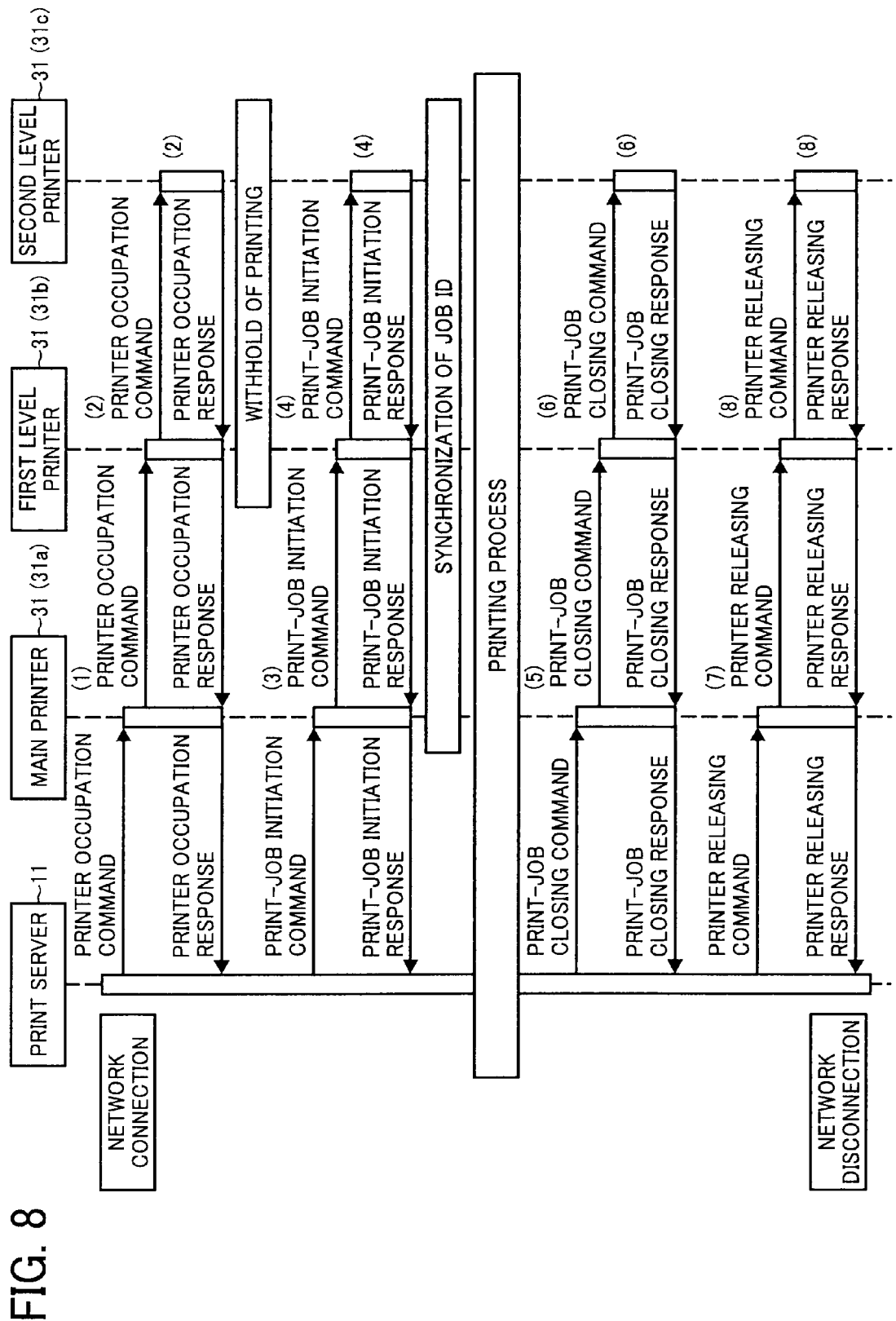
FIG. 8 is a sequence diagram of an exemplary network printing process in the network printing system.

FIG. 8 is a sequence diagram of an exemplary network printing process in the network printing system 100. In the example shown in FIG. 8, the intranet environment B includes a main printer 31a, a first level printer 31b, and a second level printer 31c, which have the identical configuration as the abovementioned printers 31.

As described above, a main printer is uniquely determined by the print server 11. Thus, the main printer functions as the highest level printer and receives print data directly from the print server 11. Meanwhile, the level of the lower level printers can be maintained in a fixed order or can be varied for each print job. For example, it is possible to store in each printer the internet protocol (IP) address of an immediate lower level printer to which print data or various commands are to be forwarded. In the example shown in FIG. 8, the second level printer 31c is configured as the immediate lower level printer with respect to the first level printer 31b, while the first level printer 31b is configured as the immediate lower level printer with respect to the main printer 31a.

The network printing process described with reference to FIG. 8 is performed in the following sequence:

(1) The print server 11 issues a printer occupation command to the main printer 31a. As a result, the main printer 31a functions as a dedicated printer to carry out print jobs instructed only by the print server 11. The command forwarding unit 212 of the main printer 31a then forwards the printer occupation command to the command receiving unit 211 of the first level printer 31b. As a result, the first level printer 31b also functions as a dedicated printer to carry out print jobs instructed by the print server 11. In addition to that, the withhold command issuing unit 203 of the main printer 31a issues a withhold command to the withhold command receiving unit 202 of the first level printer 31b. The withhold command instructs the first level printer 31b to withhold printing.

Figure 9:
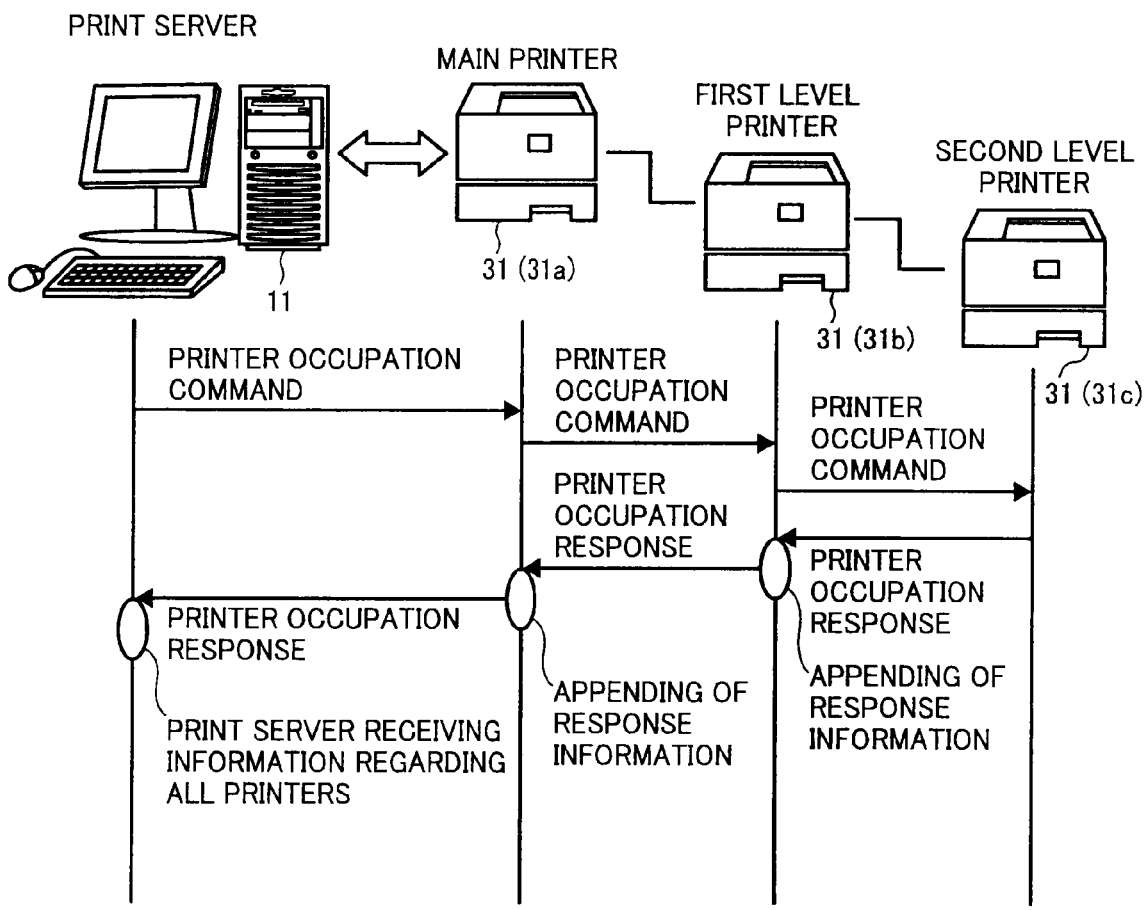
FIG. 9 is a sequence diagram of sequential appending of response information in the network printing system.

(2) Subsequently, the command forwarding unit 212 of the first level printer 31b forwards the printer occupation command to the command receiving unit 211 of the second level printer 31c, while the withhold command issuing unit 203 of the first level printer 31b issues a withhold command to the withhold command receiving unit 202 of the second level printer 31c. Because no immediate lower level printer is arranged with respect to the second level printer 31c, it sends back a response corresponding to the printer occupation command (hereinafter, "printer occupation response") to the response information receiving unit 213 of the first level printer 31b. The printer occupation response includes response information (e.g., IP address) of the second level printer 31c. The response information appending unit 214 of the first level printer 31b appends the response information of the second level printer 31c to response information of its own (see FIG. 9). The appended response information is then sent to the main printer 31a. The response information appending unit 214 of the main printer 31a then appends the response information received from the first level printer 31b to response information of its own (see FIG. 9). The appended information sending unit 215 of the main printer 31a then sends the appended response information to the appended information receiving unit 302 of the print server 11.

In this way, the print server 11 obtains updated response information regarding all the dedicated printers and keeps a log of the updated response information.

Meanwhile, as described above, the main printer 31a communicates information with the print server 11 via the external network 101 and the firewall 6. For that, either the firewall 6 can be configured to allow the communication of information or the information can be communicated in the form of an attachment to an electronic mail.

(3) The print server 11 then issues a print-job initiating command to the main printer 31a. Consequently, the main printer 31a performs a print-job initiating process and forwards the print-job initiating command to the first level printer 31b along with a job ID of the initiated print job.

(4) The first level printer 31b also performs a print-job initiating process by using the received job ID. Performing a print-job initiating process by using the same job ID leads to synchronization of the print-job initiating process in the main printer 31a and the first level printer 31b. Subsequently, the first level printer 31b then forwards the print-job initiating command to the second level printer 31c along with the same job ID. The second level printer 31c performs a print-job initiating process by using the received job ID. Thus, the print-job initiating process is maintained in synchronization in the main printer 31a, the first level printer 31b, and the second level printer 31c. Because no immediate lower level printer is arranged with respect to the second level printer 31c, it sends back a response corresponding to the print-job initiating command (hereinafter, "print-job initiating response") to the first level printer 31b, which in turn sends a print-job initiating response to the main printer 31a. Eventually, the main printer 31a sends a print-job initiating response to the print server 11.

Figure 10:
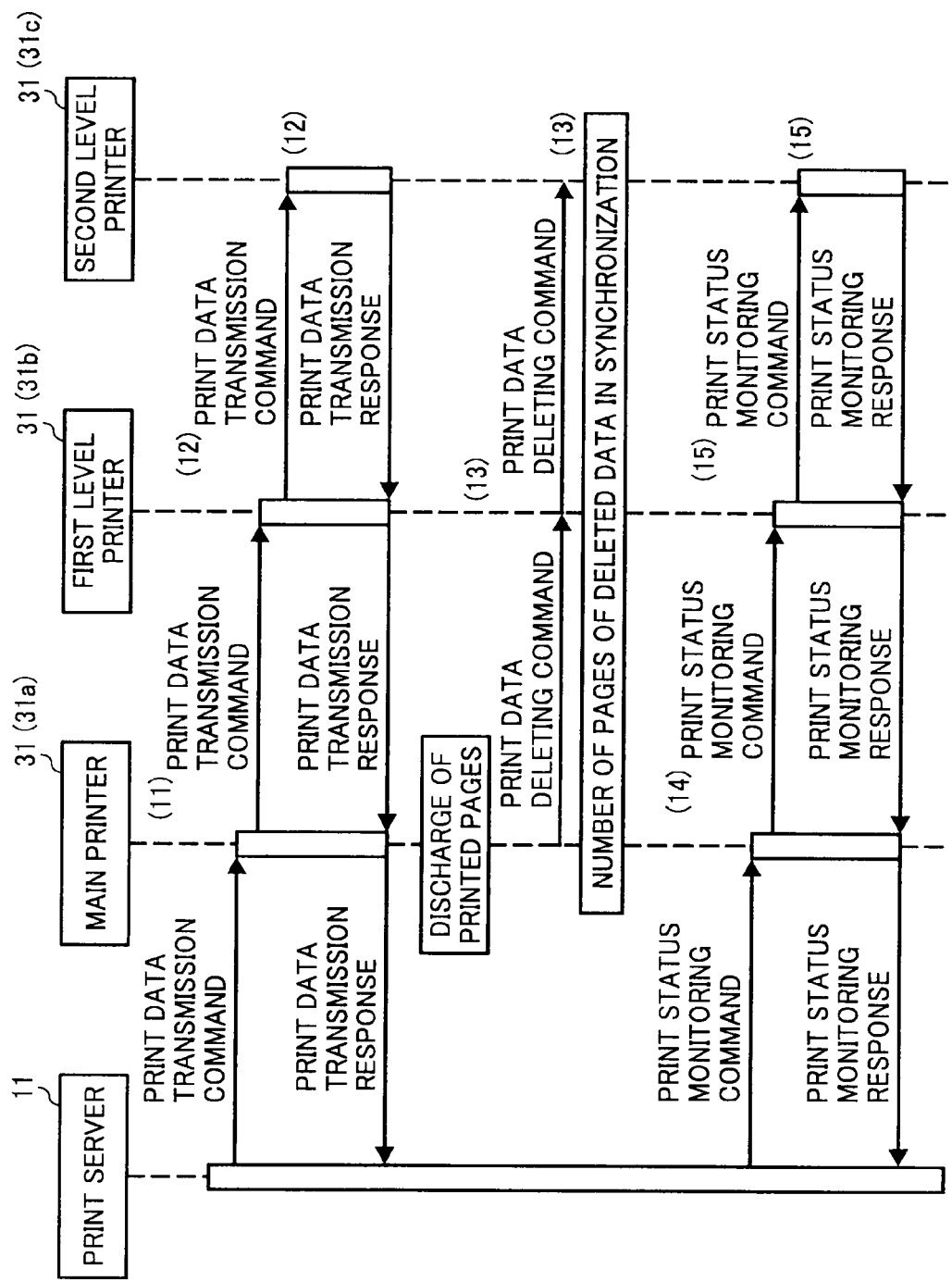
FIG. 10 is a sequence diagram of an exemplary printing process when no error occurs in a main printer.

Subsequently, the main printer 31a prints the print data in the initiated print job. FIG. 10 is a sequence diagram of an exemplary printing process of the initiated print job when the main printer 31a prints the print data in entirety without occurrence of an error. The printing process with reference to FIG. 10 is performed in the following sequence:

(11) The print server 11 issues a print data transmission command to the main printer 31a. The print data forwarding unit 204 of the main printer 31a forwards the print data transmission command to the first level printer 31b.

(12) Subsequently, the print data forwarding unit 204 of the first level printer 31b forwards the print data transmission command to the second level printer 31c. Because no immediate lower level printer is arranged with respect to the second level printer 31c, it sends back a response corresponding to the data transmission command (hereinafter, "print data transmission response") to the first level printer 31b and performs print data processing of the initiated print job. Eventually, the first level printer 31b sends a print data transmission response to the main printer 3a, which in turn sends a print data transmission response to the print server 11. Then, the main printer 31a performs print data processing of the initiated print job and prints the print data in the initiated print job.

(13) For each printed and discharged page of the print data, the data-delete command issuing unit 207 of the main printer 31a issues a print data deleting command to the data-delete command receiving unit 205 of the first level printer 31b. Consequently, the data deleting unit 206 of the first level printer 31b deletes the print data corresponding to the discharged page. Subsequently, the data-delete command issuing unit 207 of the first level printer 31b forwards the print data deleting command to the data-delete command receiving unit 205 of the second level printer 31c. Consequently, the data deleting unit 206 of the second level printer 31c also deletes the print data corresponding to the discharged page of the print data. In this way, the deleted data corresponding to the discharged pages is maintained in synchronization in the main printer 31a, the first level printer 31b, and the second level printer 31c.

(14) The host-apparatus command issuing unit 301 of the print server 11 issues a print status monitoring command to the command receiving unit 211 of the main printer 31a. The command forwarding unit 212 of the main printer 31a then forwards the print status monitoring command to the command receiving unit 211 of the first level printer 31b.

(15) In turn, the command forwarding unit 212 of the first level printer 31b forwards the print status monitoring command to the command receiving unit 211 of the second level printer 31c. Because no immediate lower level printer is arranged with respect to the second level printer 31c, it sends back a print status monitoring response to the first level printer 31b, which in turn sends a print status monitoring response to the main printer 31a.

Figure 11:
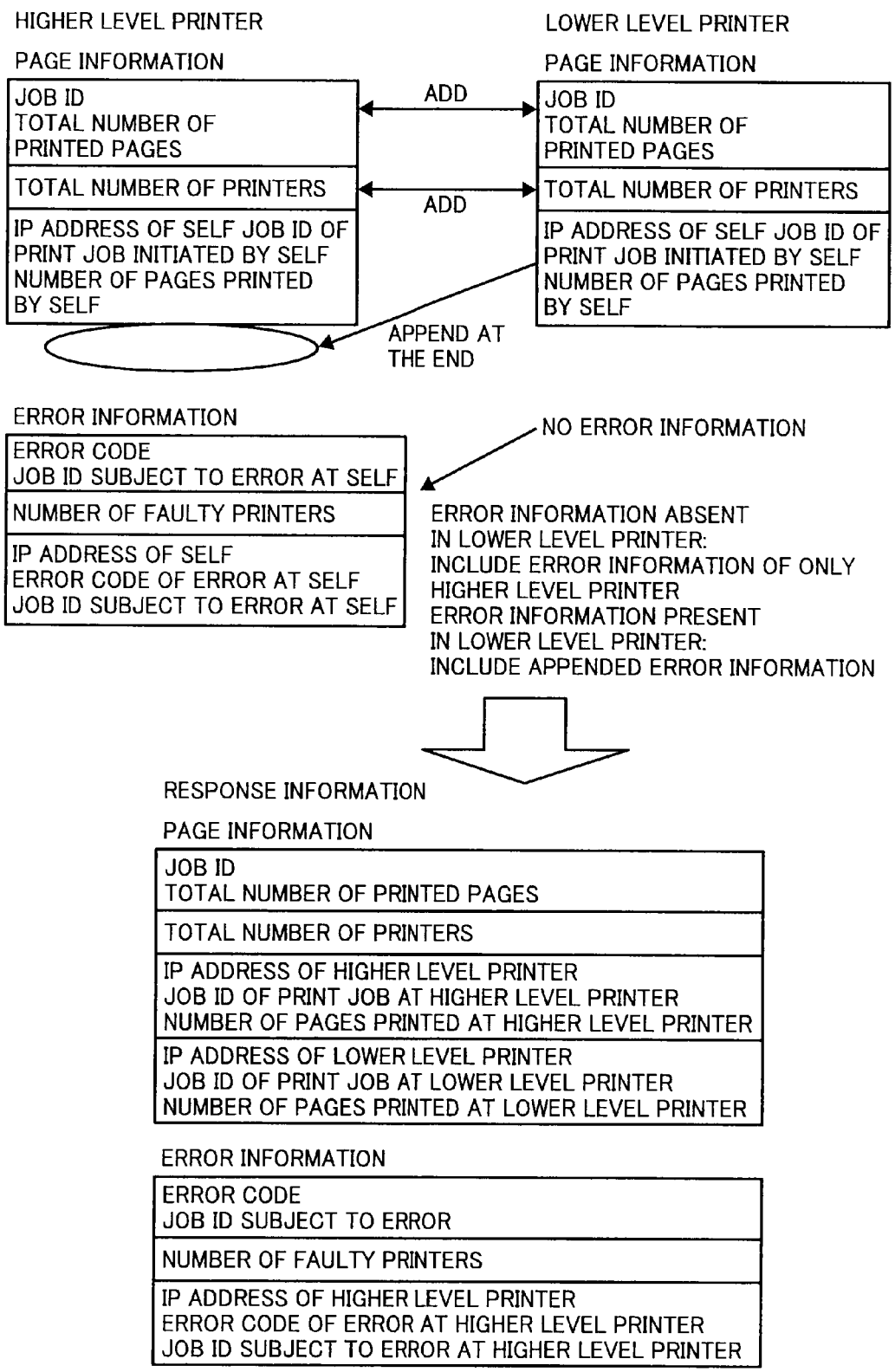
FIG. 11 is a diagram for explaining exemplary appending of response information.

As shown in FIG. 11, a higher level printer, which can be a main printer, appends page information of a corresponding lower level printer to page information of its own to generate appended page information. The page information of each printer includes the total number of printed pages for the initiated print job, the total number of printers, and the printer information (e.g., IP address, job ID of initiated print job, number of printed pages) of each printer. In a higher level printer, first, the response information receiving unit 213 receives the page information from the corresponding immediate lower level printer. Then, the response information appending unit 214 appends the received page information to the page information of its own and the appended information sending unit 215 sends the appended page information to the corresponding immediate higher level printer.

Along with the page information, a higher level printer appends error information of the corresponding lower level printer to error information of its own to generate appended error information. The error information of each printer includes an error code for the interrupted print job, the number of printers in which the print job was interrupted due to an error, and its own printer information. In the example shown in FIG. 11, error information is not generated in the lower level printer because no error occurs therein.

As shown in FIG. 10, upon generating the appended page information and the appended error information, the main printer 31a sends a print status monitoring response to the print server 11. The print status monitoring response includes the appended page information and the appended error information. Subsequently, the printing process is completed unless an error occurs in the main printer 31a.

Because of the print status monitoring response, the print server 11 is able to obtain the information regarding the total number of printed pages of the initiated print job and the print status of each of the main printer 31a, the first level printer 31b, and the second level printer 31c. The print server 11 keeps a log of the information obtained from the print status monitoring response. Meanwhile, in the example shown in FIG. 10, the print data is printed in entirety by the main printer 31a. Thus, the total number of printed pages notified to the print server 11 is equal to the number of pages printed by the main printer 31a.

FIG. 12 is a diagram for explaining an exemplary page information table T1 maintained in the RAM 43 of the print server 11. The page information table T1 is used to store the appended page information obtained from the print status monitoring response of the main printer 31a. The page information table T1 includes three portions, namely, a, b, and c. In the portion a, basic information such as the job ID of each initiated print job and the number of printed pages for the initiated print job is stored. In the portion b, the total number of printers that sent the response information is stored. In the portion c, the printer information of each printer (e.g., the IP address, job ID of initiated print job, number of printed pages) is stored. Meanwhile, as described above, the job ID of the print job initiated by each printer is identical.

FIG. 13 is a diagram for explaining an exemplary error information table T2 maintained in the RAM 43 of the print server 11. The error information table T2 is used to store the appended error information obtained from the print status monitoring response of the main printer 31a. The error information table T2 includes three portions, namely, d, e, and f. In the portion d, information such as the error code for each interrupted print job and the printers at which the print job was interrupted is stored. In the portion e, the number of printers at which the print job was interrupted is stored. In the portion f, the printer information each printer (e.g., IP address, job ID of the interrupted print job, and number of printed pages for the interrupted print job) at which the print job was interrupted is stored. Meanwhile, as described above, the job ID of the print job interrupted in any of the printers is identical.

Figure 14:
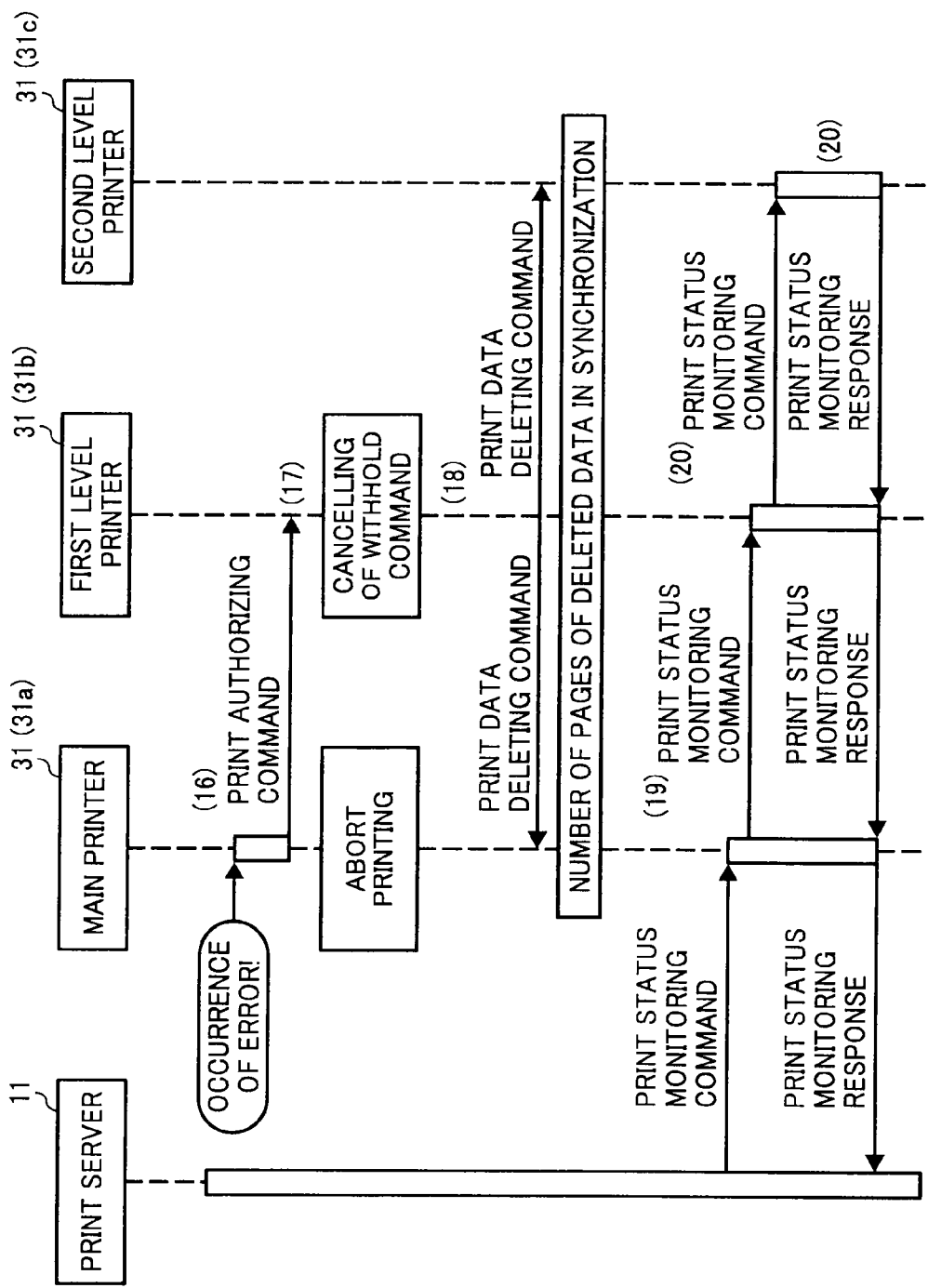
FIG. 14 is a sequence diagram of an exemplary substitutive printing process when an error occurs in a main printer while printing print data.

FIG. 14 is a sequence diagram of an exemplary substitutive printing process when an error occurs in the main printer 31a while printing the print data. A substitutive printing process can be performed when a plurality of printers is connected via a LAN by using a linear topology, a star topology, a ring topology, and the like. In such a configuration, it is possible to substitutively perform printing of print data in a substitute printer in case a problem occurs in the current printer while printing that print data.

The substitutive printing process with reference to FIG. 14 is performed in the following sequence:

(16) If an error occurs in the main printer 31a while printing the print data, then the print-authorizing command issuing unit 210 of the main printer 31a issues a print authorizing command to the print-authorizing command receiving unit 208 of the first level printer 31b. The main printer 31a then aborts printing of the print data and withholds printing thereafter.

(17) Subsequently, the withhold command cancelling unit 209 of the first level printer 31b cancels the withhold command assigned thereto. As a result, the first level printer 31b can substitutively start to print the print data in place of the main printer 31a.

(18) For each printed and discharged page of the print job, the data-delete command issuing unit 207 of the first level printer 31b issues a print data deleting command to the data-delete command receiving unit 205 of each of the main printer 31a and the second level printer 31c. Consequently, the data deleting unit 206 of each of the main printer 31a and the second level printer 31c deletes the print data corresponding to the discharged page.

(19) The host-apparatus command issuing unit 301 of the print server 11 issues the print status monitoring command to the command receiving unit 211 of the main printer 31a. The command forwarding unit 212 of the main printer 31a then forwards the print status monitoring command to the command receiving unit 211 of the first level printer 31b.

(20) In turn, the command forwarding unit 212 of the first level printer 31b forwards the print status monitoring command to the command receiving unit 211 of the second level printer 31c. Because no immediate lower level printer is arranged with respect to the second level printer 31c, it sends back a print status monitoring response to the first level printer 31b, which in turn sends a print status monitoring response to the main printer 31a. Eventually, the main printer 31a sends a print status monitoring response to the print server 11. The print status monitoring response includes the page information and the error information of each of the main printer 31a, the first level printer 31b, and the second level printer 31c. As a result, the print server 11 is able to obtain the information regarding the total number of printed pages and the print status of each of the main printer 31a, the first level printer 31b, and the second level printer 31c. The print server 11 keeps a log of the information obtained from the print status monitoring response of the main printer 31a. Meanwhile, in the example shown in FIG. 14, the print data is printed first by the main printer 31a and then by the first level printer 31b. Thus, the total number of printed pages notified to the print server 11 is equal to the addition of the number of pages printed by the main printer 31a and the number of pages printed by the first level printer 31b.

Figure 15:
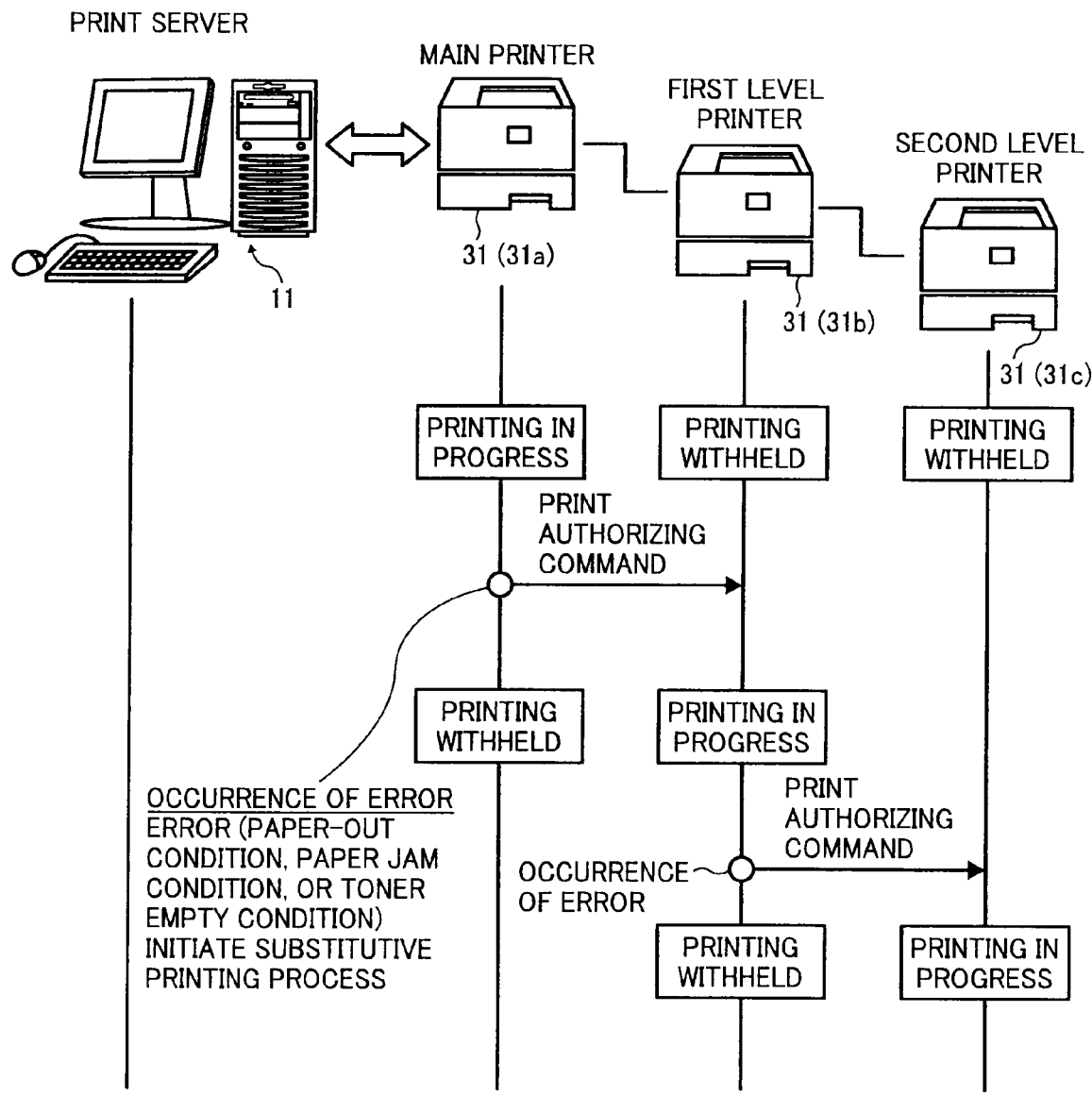
FIG. 15 is a sequence diagram of an exemplary substitutive printing process when an error occurs in more than one printer while printing print data.

In this way, even if an error occurs in the main printer 31a while printing the print data, the error information is not immediately notified to the print server 11. Instead, the first level printer 31b is instructed to substitutively continue the printing process. Similarly, even if an error occurs in the first level printer 31b while printing the print data, the second level printer 31c is instructed to substitutively continue the printing without immediately notifying the error information to the print server 11 (see FIG. 15).

When an error occurs only in the main printer 31a, the appended error information notified to the print server 11 includes the error information only of the main printer 31a. If the first level printer 31b successfully prints the remaining print data, then no error information is generated therein.

Figure 16:
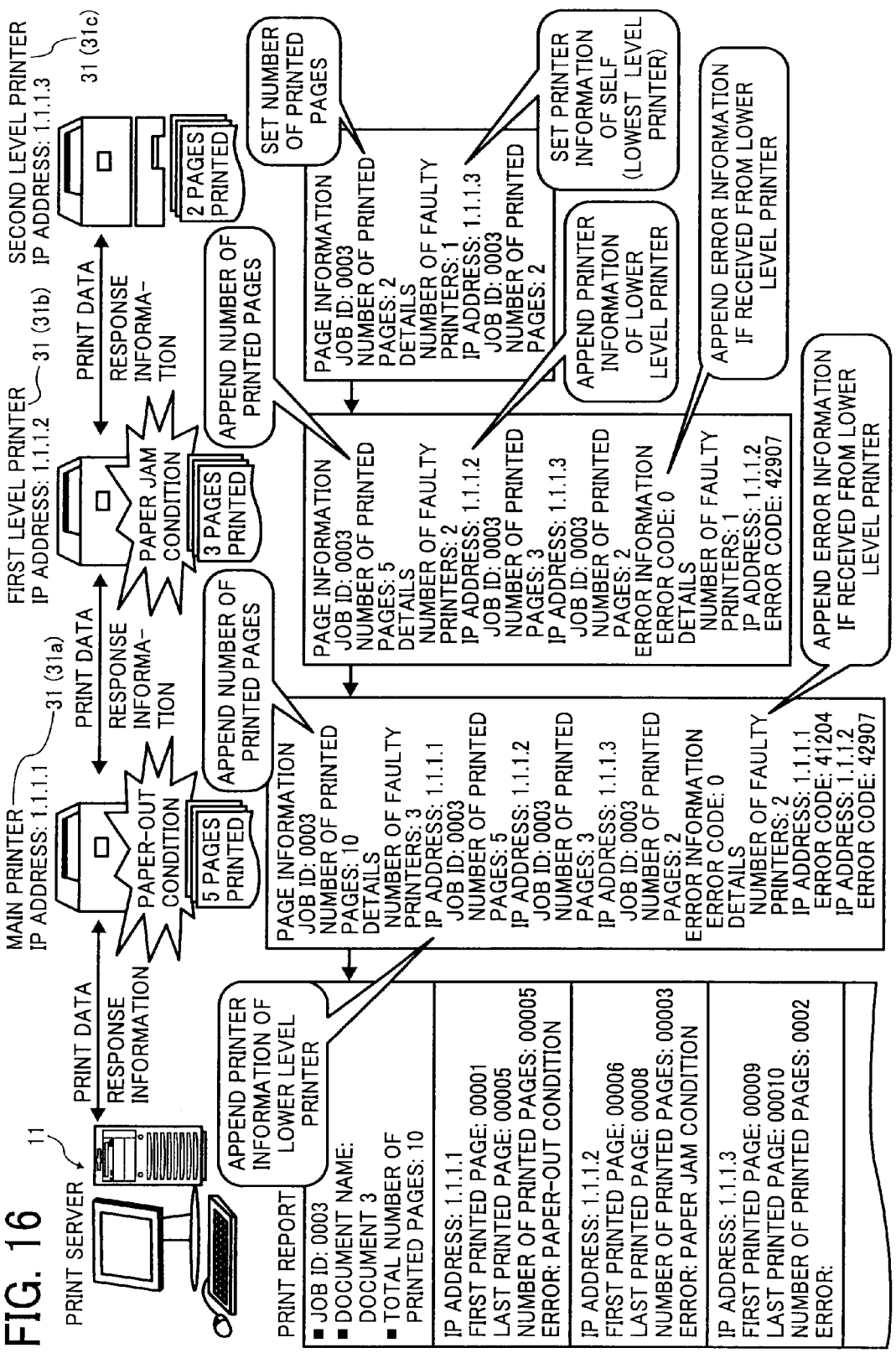
FIG. 16 is a diagram for explaining an exemplary substitutive printing process when an error occurs in more than one printer while printing print data.

FIG. 16 is a diagram for explaining an exemplary substitutive printing process when an error occurs in each of the main printer 31a and the first level printer 31b while printing the print data. In the example shown in FIG. 16, it is assumed that the print server 11 instructs the main printer 31a to print 10 pages of print data. The main printer 31a is assumed to print the first five pages before an error occurs therein. Similarly, the first level printer 31b is assumed to print the subsequent three pages before an error occurs therein. Eventually, the second level printer 31c is assumed to successfully print the last two pages such that the printing process is complete. In this case, the appended error information notified to the print server 11 includes the error information of the main printer 31a and the first level printer 31b.

When the print server 11 receives the print status monitoring response from the main printer 31a, it is able to obtain the information regarding the number of printed pages at each of the main printer 31a, the first level printer 31b, and the second level printer 31c as well as the error information of the main printer 31a and the first level printer 31b.

Upon completion of each printing process, the print server 11 releases the main printer 31a, the first level printer 31b, and the second level printer 31c from the dedicated status in the following sequence with reference to FIG. 8:

(5) First, the print server 11 issues a print-job closing command to the main printer 31a. Consequently, the main printer 31a closes the initiated print job and forwards the print-job closing command to the first level printer 31b.

(6) Subsequently, the first level printer 31b closes the initiated print job and forwards the print-job closing command to the second level printer 31c. Because no immediate lower level printer is arranged with respect to the second level printer 31c, it sends back a response corresponding to the print-job closing command (hereinafter, "print-job closing response") to the first level printer 31b, which in turn sends a print-job closing response to the main printer 31a. Eventually, the main printer 31a sends a print-job closing response to the print server 11 indicating that each of the main printer 31a, the first level printer 31b, and the second level printer 31c has closed the initiated print job.

(7) The print server 11 then issues a printer releasing command to the main printer 31a such that the main printer 31a is released from the dedicated status with respect to the print server 11. The main printer 31a then forwards the printer releasing command to the first level printer 31b.

(8) Consequently, the first level printer 31b is released from the dedicated status with respect to the print server 11. The first level printer 31b then forwards the printer releasing command to the second level printer 31c. Because no immediate lower level printer is arranged with respect to the second level printer 31c, it sends back a response corresponding to the printer releasing command (hereinafter, "printer releasing response") to the first level printer 31b, which in turn sends a printer releasing response to the main printer 31a. Eventually, the main printer 31a sends a printer releasing response to the print server 11 indicating that each of the main printer 31a, the first level printer 31b, and the second level printer 31c is released from the dedicated status with respect to the print server 11.

Figure 17:
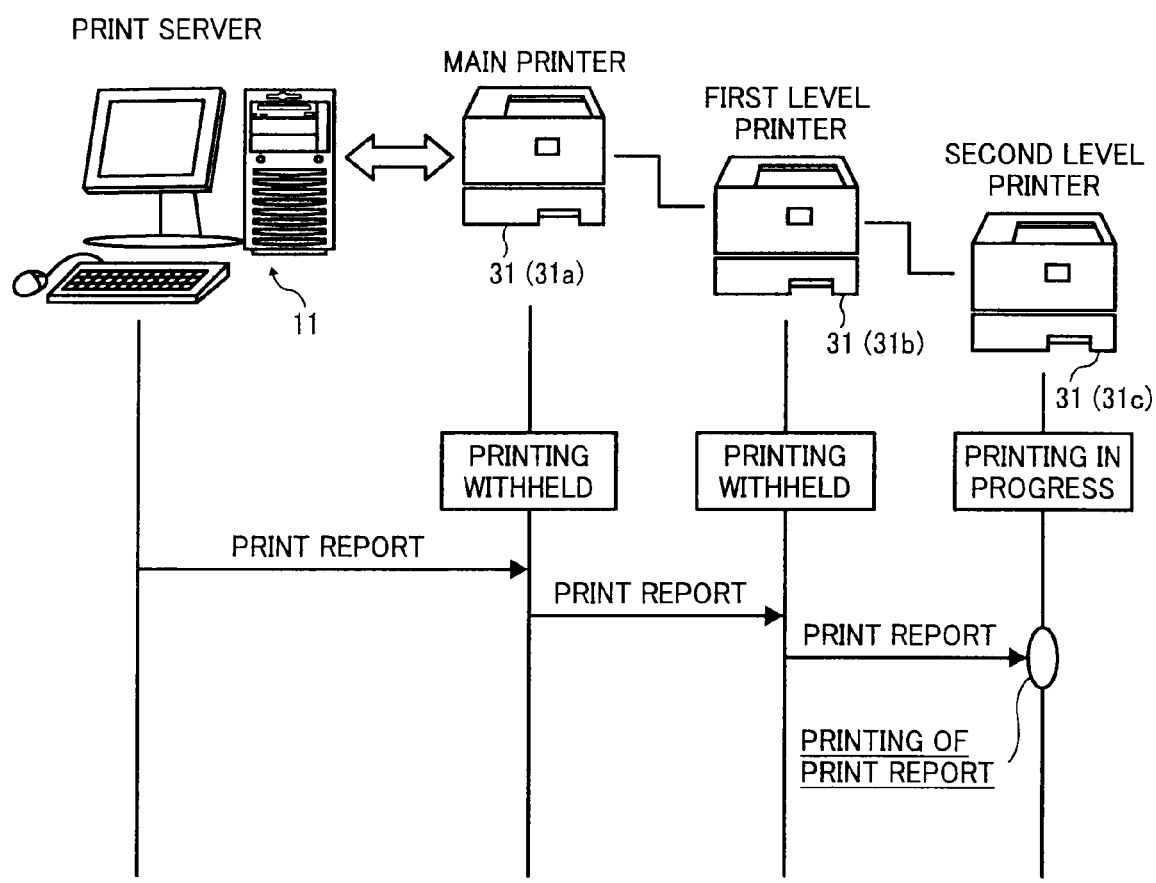
FIG. 17 is a sequence diagram of an exemplary print report generating process performed after completion of the substitutive printing process.
Figure 19:
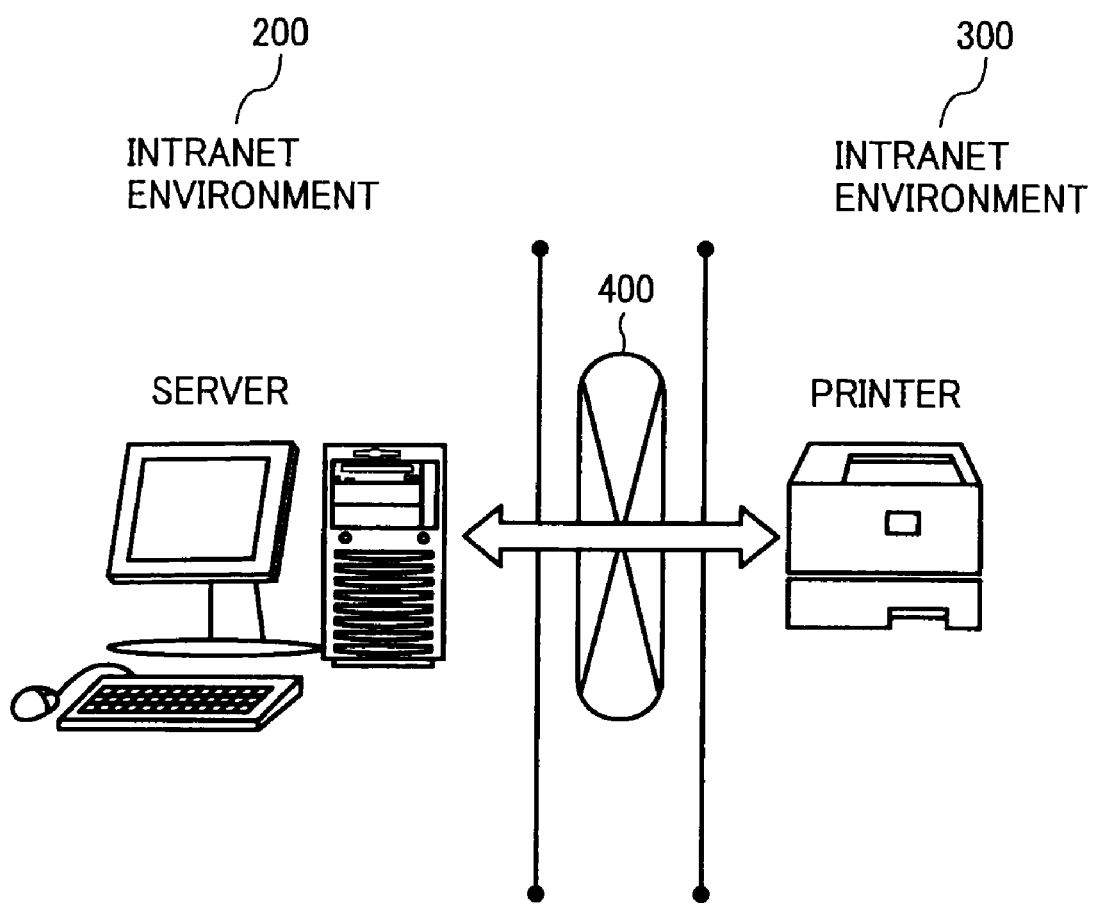
FIG. 19 is a schematic diagram for explaining a conventional network printing system.

FIG. 17 is a sequence diagram of an exemplary print report generating process performed after completion of the substitutive printing process described with reference to FIG. 16. In the print server 11, the print report generating unit 303 generates a print report based on the page information table T1 and the error information table T2. Subsequently, the print report sending unit 304 sends the print report to the main printer 31a.

The print report is then sequentially forwarded to the first level printer 31b and the second level printer 31c. The second level printer 31c is instructed, as the last printer to perform substitutive printing, to print the print report.

FIG. 18 is a diagram of an exemplary print report generated by the print report generating unit 303 and printed by the second level printer 31c. The print report includes the job ID of the initiated print job, a document name of the initiated print job, and the total number of printed pages of the initiated print job. The print report also includes the printer information of each of the main printer 31a, the first level printer 31b, and the second level printer 31c. The printer information of each printer includes the IP address, the page number of the first printed page, the page number of the last printed page, the total number of pages printed, and error information. By circulating the print report to each of the main printer 31a, the first level printer 31b, and the second level printer 31c, it becomes possible to crosscheck whether the substitutive printing process is performed properly. Moreover, by instructing the second level printer 31c to print the print report, it becomes possible for the user to confirm the number of pages printed at each of the main printer 31a, the first level printer 31b, and the second level printer 31c by.

To sum up, a higher level printer in a network printing system issues a withhold command to an immediate lower level printer by which the lower level printer is instructed to withhold printing. Then, the higher level printer forwards print data, which is transmitted by a host apparatus (e.g., print server), to the lower level printer. Moreover, for each printed and discharged page of the print data, the higher level printer issues a print data deleting command to the lower level printer by which the lower level printer is instructed to delete a portion of the print data corresponding to the printed page. As a result, the deleted data corresponding to the discharged pages is maintained in synchronization in the higher level printer and the lower level printer. That facilitates in instructing the lower level printer to substitutively perform printing of the print data in place of the higher level printer in case an error such as a paper-out condition, a paper jam condition, or a toner empty condition occurs in the higher level printer while printing the print data. For that, the withhold command assigned to the lower level printer is cancelled by authorizing it to substitutively print the print data. In this way, even if the host apparatus and the printers are arranged in separate intranet environments connected by an external network, the abovementioned substitutive printing process enhances the reliability of the network printing system.

In other words, because of the substitutive printing process, the print data is successfully printed irrespective of an error in one or more printers in the network printing system. That enhances the reliability of the network printing system.

Meanwhile, printer information (e.g., print status and number of printed pages) of a lower level printer is appended to printer information of a corresponding immediate higher level printer. Such appended printer information of all the printers is sent to the host apparatus. As a result, the host apparatus is able to accurately obtain the information regarding the total number of printed pages and the print status of each printer in the network printing system.

Moreover, based on the printer information, the host apparatus generates a print report. The print report is circulated to each printer such that it is possible to crosscheck whether the substitutive printing process is performed properly. Furthermore, a lower level printer that performs the substitutive printing at the last is instructed to print the print report. That enables a user to confirm the number of pages printed at each printer.

Thus, according to an aspect of the present invention, a plurality of printers is connected to perform a substitutive printing process thereby enabling reliably printing of print data even if an error occurs in one or more printers.

Moreover, the print data is successfully printed without interruption thereby reducing the man-hours that are consumed in system recovery in case of an interruption.

What is claimed is:

1. A printing device configured to print printing target data received from a host apparatus on a recording medium, the printing device connectable to a lower level printing device that is a different printing device arranged on a downstream side with respect to the host apparatus via a network, the printing device comprising:
   a withhold command issuing unit that causes the printing device to function as a dedicated printer upon a reception of a printer occupation command from the host apparatus and issues a withhold command to the lower level printing device to instruct the lower level printing device to withhold printing, wherein, when receiving the printer occupation command from the host apparatus, the withhold command issuing unit starts a session based on a response provided by each of a plurality of printers in response to the printer occupation command;
   a data sending unit that sends the printing target data to the lower level printing device;
   a printing unit that prints the printing target data on a recording medium on a page by page basis; and
   a data-delete command issuing unit that, for each printed page printed by the printing unit, issues a print data deleting command to the lower level printing device to instruct the lower level printing device to delete a portion of the printing target data corresponding to the printed page, wherein, when a printing of a last page is completed, the printing device receives a printer releasing command from the host apparatus, forwards the printer releasing command to each of the plurality of printers, receives a response from each of the plurality of printers, and sends the response to the host apparatus to end the session according to the response sent to the host apparatus.

2. The printing device according to claim 1, further comprising:
   a print-authorizing command issuing unit that, when the printing device is unable to perform a printing, issues a print authorizing command to the lower level printing device, the print authorizing command instructing the lower level printing device to cancel the withhold command.

3. The printing device according to claim 1, further comprising:
   a request receiving unit that receives a request from the host apparatus;
   a generating unit that generates first response information corresponding to the request;
   a request forwarding unit that forwards the request to the lower level printing device;
   a response receiving unit that receives second response information from the lower level printing device corresponding to the request;
   an appending unit that appends the first response information and the second response information to obtain an appended response; and
   a sending unit that sends the appended response to the host apparatus.

4. The printing device according to claim 3, wherein the request is a print status monitoring request for monitoring a print status of the printing device and the lower level printing device, the first response information includes information regarding the print status of the printing device and the second response information includes information regarding the print status of the lower level printing device.

5. The printing device according to claim 1, wherein the printing device has an identical configuration with the lower level printing device.

6. A printing device configured to print printing target data received from a host apparatus on a recording medium, the printing device connected to a higher level printing device that is a different printing device arranged on an upstream side with respect to the host apparatus via a network and the printing device is connectable to a lower level printing device that is a different printing device arranged on a downstream side with respect to the host apparatus via a network, the printing device comprising:
   a withhold command receiving unit that receives a withhold command from the higher level printing device and causes the printing device to function as a dedicated printer upon a reception of a printer occupation command from the higher level printing device, the withhold command instructing the printing device to withhold printing;
   a withhold command forwarding unit that forwards the withhold command to the lower level printing device, the withhold command instructing the lower level printing device to withhold printing, wherein, when the withhold command receiving unit receives the printer occupation command from the higher level printing device, the withhold command forwarding unit starts a session based on a response provided by the lower level printing device in response to the printer occupation command;
   a data receiving unit that receives printing target data from the higher level printing device;
   a data sending unit that sends the printing target data to the lower level printing device;
   a printing unit that prints the printing target data on a recording medium on a page by page basis;
   a data-delete command receiving unit that receives a print data deleting command from the higher level printing device, the print data deleting command instructing the printing device to delete a portion of the printing target;
   a data deleting unit that deletes the portion of the printing target data specified in the print data deleting command; and
   a data-delete command forwarding unit that forwards the print data deleting command to the lower level printing device if installed, the printing target data deleting command instructing the lower level printing device to delete the portion of the printing target data specified in the print data deleting command, wherein, when a printing If a last page is completed, the printing device receives a printer releasing command from the higher level printing device, forwards the printer releasing command to the lower level printing device, receives a response from the lower level printing device, and sends the response to the higher level printing device to end the session according to the response sent to the higher level printing device.

7. The printing device according to claim 6, further comprising:
   a print-authorizing command receiving unit that, when the higher level printing device is unable to perform printing, receives a print authorizing command from the higher level printing device, the print authorizing command instructing to cancel the withhold command;

a withhold command cancelling unit that, when the print-authorizing command receiving unit receives the print authorizing command, cancels the withhold command and makes the printing unit ready to perform the printing withheld by the printing device; and a print-authorizing command issuing unit that, when the printing device is unable to perform the printing withheld by the printing device, issues a print authorizing command to the lower level printing device.

8. The printing device according to claim 6, further comprising:

a request receiving unit that receives a request from the higher level printing device;

a generating unit that generates first response information corresponding to the request;

a request forwarding unit that forwards the request to the lower level printing device;

a response receiving unit that receives second response information from the lower level printing device corresponding to the request;

an appending unit that appends the first response information and the second response information to obtain an appended response; and a sending unit that sends the appended response to the higher level printing device.

9. The printing device according to claim 8, wherein the request is a print status monitoring request for monitoring a print status of the printing device and the lower level printing device, the first response information includes information regarding the print status of the printing device, and the second response information includes information regarding the print status of the lower level printing device.

10. The printing device according to claim 6, wherein the printing device has an identical configuration with the higher level printing device and with the lower level printing device.

11. A printing system including two or more printing devices to perform a printing of printing target data received from a host apparatus, the host apparatus being connected to the printing devices via a network, the printing system comprising:

a withhold command issuing unit that causes a highest level printing device arranged on an upstream side of data communication to function as a dedicated printer upon a reception of a printer occupation command from the host apparatus, wherein, when receiving the printer occupation command from the host apparatus, the withhold command issuing unit starts a session based on a response provided in response to the printer occupation command by a lowest level printing device arranged on a downstream side of the data communication;

a monitoring request sending unit that sends a print status monitoring request generated by the host apparatus to a highest level printing device;

a monitoring request forwarding unit that sequentially forwards a print status monitoring request from the highest level printing device to the lowest level printing device;

an appending unit that appends response information generated in each of the printing devices corresponding to the print status monitoring request in a sequence from the lowest level printing device to the highest level printing device to obtain an appended response;

an appended response sending unit that sends the appended response to the host apparatus, wherein, when a printing of a last page is completed, the highest level printing device receives a printer releasing command from the host apparatus, forwards the printer releasing command to the lowest level printing device, receives a response from the lowest level printing device, and sends the response to the host apparatus to end the session according to the response sent to the host apparatus;

a print report generating unit that, based on the appended response, generates a print report regarding a print status of each of the printing devices; and a print report sending unit that sends the print report to a printing device from among the printing devices that performs a printing last.

12. A printing system including two or more printing devices to perform a printing of printing target data received from a host apparatus, the host apparatus being connected to the printing devices via a network, the printing system comprising:

a withhold command issuing unit that causes a highest level printing device arranged on an upstream side of a data communication to function as a dedicated printer upon a reception of a printer occupation command from the host apparatus, wherein, when receiving the printer occupation command from the host apparatus, the withhold command issuing unit starts a session based on a response provided in response to the printer occupation command by a lowest level printing device arranged on a downstream side of the data communication;

a request sending unit that sends a request generated by the host apparatus to each of the printing devices in a sequence from a highest level printing device to the lowest level printing device;

an appending unit that appends response information generated in each of the printing devices corresponding to a print status monitoring request in a sequence from the lowest level printing device to the highest level printing device to obtain an appended response; and an appended response sending unit that sends the appended response to the host apparatus, wherein, when a printing of a last page is completed, the highest level printing device receives a printer releasing command from the host apparatus, forwards the printer releasing command to the lowest level printing device, receives a response from the lowest level printing device, and sends the response to the host apparatus to end the session according to the response sent to the host apparatus.

13. The printing system according to claim 12, wherein the print status monitoring request is for monitoring a print status of the highest level printing device and the lowest level printing device, and the response information includes information regarding the print status of the highest level printing device and information regarding the print status of the lowest level printing device.

14. The printing system according to claim 12, wherein each of the printing devices has an identical configuration.

* * * * *